(12) United States Patent
Havens et al.

(10) Patent No.: US 8,305,691 B2
(45) Date of Patent: Nov. 6, 2012

(54) FLUID LENS ELEMENT FOR USE IN CHANGING THERMAL OPERATING ENVIRONMENT

(75) Inventors: William H. Havens, Syracuse, NY (US); Chen Feng, Snohomish, WA (US); Ynjiun P. Wang, Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 418 days.

(21) Appl. No.: 12/432,434

(22) Filed: Apr. 29, 2009

(65) Prior Publication Data

US 2010/0276491 A1    Nov. 4, 2010

(51) Int. Cl.
G02B 1/06    (2006.01)
G02B 3/12    (2006.01)

(52) U.S. Cl. .................................. 359/665; 359/666

(58) Field of Classification Search ............... 359/665, 359/666
See application file for complete search history.

(56) References Cited

U.S. PATENT DOCUMENTS

| | | |
|---|---|---|
| 5,113,445 A | 5/1992 | Wang |
| 5,243,655 A | 9/1993 | Wang |
| 5,337,361 A | 8/1994 | Wang et al. |
| 5,393,965 A | 2/1995 | Bravman et al. |
| 5,401,944 A | 3/1995 | Bravman et al. |
| 5,471,533 A | 11/1995 | Wang et al. |
| 5,489,158 A | 2/1996 | Wang et al. |
| 5,513,264 A | 4/1996 | Wang et al. |
| 5,579,487 A | 11/1996 | Meyerson et al. |
| 5,646,389 A | 7/1997 | Bravman et al. |
| 5,659,167 A | 8/1997 | Wang et al. |
| 5,710,419 A | 1/1998 | Wang et al. |
| 5,742,263 A | 4/1998 | Wang et al. |
| 5,793,033 A | 8/1998 | Feng et al. |
| 5,818,023 A | 10/1998 | Meyerson et al. |
| 5,834,754 A | 11/1998 | Feng et al. |
| 5,866,888 A | 2/1999 | Bravman et al. |
| 5,880,453 A | 3/1999 | Wang et al. |
| 5,917,913 A | 6/1999 | Wang |
| 5,945,670 A | 8/1999 | Rudeen |
| 6,024,283 A | 2/2000 | Campanelli et al. |
| 6,062,476 A | 5/2000 | Stern et al. |
| 6,175,922 B1 | 1/2001 | Wang |

(Continued)

FOREIGN PATENT DOCUMENTS

EP    1450291    8/2004

(Continued)

OTHER PUBLICATIONS

Varioptic's Liquid Auto-Focus Lens Wins 1st Prize in 2006 Dupont Plunkett Awards for Innovation With Teflon® (4 pages).

(Continued)

*Primary Examiner* — William Choi
(74) *Attorney, Agent, or Firm* — Heslin Rothenberg Farley & Mesiti P.C.

(57) ABSTRACT

There is provided a lens element configured so that optical characteristics thereof remain substantially stable over a range of operating temperatures. In one embodiment, a fluid lens element can be provided that includes a membrane having a formation formed thereon for accommodating changes in characteristics of the lens element attributable to changes in temperature so that an amount of perturbations in the lens element which would otherwise be exhibited with thermal expansion of the membrane are minimized.

28 Claims, 12 Drawing Sheets

U.S. PATENT DOCUMENTS

| | | | |
|---|---|---|---|
| 6,188,526 B1 | 2/2001 | Sasaya et al. |
| 6,246,528 B1 | 6/2001 | Schachar |
| 6,282,656 B1 | 8/2001 | Wang |
| 6,288,846 B1 | 9/2001 | Stoner, Jr. |
| 6,344,930 B1 | 2/2002 | Kaneko et al. |
| 6,543,693 B1 | 4/2003 | Stern et al. |
| 6,594,759 B1 | 7/2003 | Wang |
| 6,618,208 B1 | 9/2003 | Silver |
| 6,658,208 B2 | 12/2003 | Watanabe et al. |
| 6,850,916 B1 | 2/2005 | Wang |
| 6,935,743 B2 | 8/2005 | Shadduck |
| 7,025,468 B2 | 4/2006 | Nishioka et al. |
| 7,065,344 B2 | 6/2006 | O'Hagan et al. |
| 7,068,439 B2 | 6/2006 | Esch et al. |
| 7,077,322 B2 | 7/2006 | Miyazawa et al. |
| 7,089,214 B2 | 8/2006 | Wang |
| 7,107,246 B2 | 9/2006 | Wang |
| 7,128,270 B2 | 10/2006 | Silverbrook et al. |
| 7,201,318 B2 | 4/2007 | Craen et al. |
| 7,243,849 B2 | 7/2007 | Lapstun et al. |
| 7,264,162 B2 | 9/2007 | Barkan |
| 7,293,712 B2 | 11/2007 | Wang |
| 7,296,749 B2 | 11/2007 | Massieu |
| 7,352,434 B2 | 4/2008 | Streefkerk et al. |
| 7,364,081 B2 | 4/2008 | Havens et al. |
| 7,369,723 B1 | 5/2008 | Mescher |
| 7,416,125 B2 | 8/2008 | Wang et al. |
| 7,450,273 B2 | 11/2008 | Silverbrook et al. |
| 7,568,628 B2 | 8/2009 | Wang et al. |
| 7,611,060 B2 | 11/2009 | Wang et al. |
| 7,635,084 B2 | 12/2009 | Wang et al. |
| 7,717,343 B2 | 5/2010 | Havens et al. |
| 7,755,840 B2 * | 7/2010 | Batchko et al. ............. 359/665 |
| 7,813,047 B2 | 10/2010 | Wang et al. |
| 7,909,257 B2 | 3/2011 | Wang et al. |
| 7,918,398 B2 | 4/2011 | Li et al. |
| 7,922,088 B2 | 4/2011 | Wang |
| 7,946,493 B2 | 5/2011 | Havens et al. |
| 8,016,189 B2 | 9/2011 | Wang et al. |
| 8,027,095 B2 | 9/2011 | Havens |
| 8,027,096 B2 | 9/2011 | Feng et al. |
| 8,038,066 B2 | 10/2011 | Havens et al. |
| 8,083,148 B2 | 12/2011 | Wang et al. |
| 8,146,820 B2 | 4/2012 | Wang et al. |
| 2002/0023215 A1 | 2/2002 | Wang et al. |
| 2002/0052185 A1 | 5/2002 | O'Hagan et al. |
| 2002/0123967 A1 | 9/2002 | Wang |
| 2003/0004827 A1 | 1/2003 | Wang |
| 2005/0145698 A1 | 7/2005 | Havens et al. |
| 2005/0200973 A1 | 9/2005 | Kogo et al. |
| 2006/0071081 A1 | 4/2006 | Wang |
| 2006/0202036 A1 | 9/2006 | Wang et al. |
| 2006/0202038 A1 | 9/2006 | Wang et al. |
| 2007/0030573 A1 | 2/2007 | Batchko et al. |
| 2007/0063048 A1 | 3/2007 | Havens et al. |
| 2007/0080280 A1 | 4/2007 | Havens |
| 2007/0089168 A1 | 4/2007 | Wang et al. |
| 2007/0097528 A1 | 5/2007 | Hagiwara et al. |
| 2007/0156021 A1 | 7/2007 | Morse et al. |
| 2007/0158428 A1 | 7/2007 | Havens et al. |
| 2007/0211207 A1 | 9/2007 | Lo et al. |
| 2008/0019015 A1 | 1/2008 | Fernandez et al. |
| 2008/0144185 A1 | 6/2008 | Wang et al. |
| 2008/0144186 A1 * | 6/2008 | Feng et al. ............. 359/666 |
| 2008/0204905 A1 | 8/2008 | Mizuno et al. |
| 2008/0218873 A1 | 9/2008 | Batchko et al. |
| 2008/0231963 A1 | 9/2008 | Batchko et al. |
| 2008/0245872 A1 | 10/2008 | Good |
| 2008/0259463 A1 | 10/2008 | Shepherd |
| 2008/0277477 A1 | 11/2008 | Thuries et al. |
| 2008/0277480 A1 | 11/2008 | Thuries et al. |
| 2009/0072037 A1 | 3/2009 | Good et al. |
| 2009/0072038 A1 | 3/2009 | Li et al. |
| 2009/0088203 A1 | 4/2009 | Havens et al. |
| 2009/0097140 A1 | 4/2009 | Choi et al. |
| 2009/0108072 A1 | 4/2009 | Wang |
| 2010/0044440 A1 | 2/2010 | Wang et al. |
| 2010/0090007 A1 | 4/2010 | Wang et al. |
| 2010/0147956 A1 | 6/2010 | Wang et al. |
| 2010/0276490 A1 | 11/2010 | Havens et al. |
| 2010/0276491 A1 | 11/2010 | Havens et al. |
| 2010/0276492 A1 | 11/2010 | Wang et al. |
| 2010/0276493 A1 | 11/2010 | Havens et al. |
| 2011/0004557 A1 | 1/2011 | Wang et al. |
| 2011/0006117 A1 | 1/2011 | Wang |
| 2011/0017829 A1 | 1/2011 | Wang et al. |
| 2011/0036908 A1 | 2/2011 | Havens et al. |
| 2011/0036911 A1 | 2/2011 | Havens et al. |
| 2011/0089245 A1 | 4/2011 | Havens et al. |
| 2011/0163165 A1 | 7/2011 | Liu et al. |
| 2011/0163166 A1 | 7/2011 | Wang et al. |
| 2011/0174880 A1 | 7/2011 | Li et al. |
| 2011/0188752 A1 | 8/2011 | Wang |
| 2011/0212751 A1 | 9/2011 | Havens et al. |
| 2011/0290887 A1 | 12/2011 | Wang et al. |
| 2011/0309145 A1 | 12/2011 | Richardson et al. |

FOREIGN PATENT DOCUMENTS

| | | |
|---|---|---|
| JP | 2002162506 | 6/2002 |
| JP | 2010157222 A | 7/2010 |
| JP | 2010170561 A | 8/2010 |
| WO | WO-9415351 | 7/1994 |
| WO | WO-2005073895 | 8/2005 |
| WO | 2006121659 A1 | 11/2006 |
| WO | WO-2008076399 | 6/2008 |
| WO | WO-2008124235 | 10/2008 |

OTHER PUBLICATIONS

Nelson, Lee: Liquid Lens—Technology, Photonics, Vision systems design, Advanced imaging URL: http://articles.directorym.net/LIQ-UID_LENS-a906589.html (5 pages).

Hayes, Tim: Fluidic lenses move from laboratory to factory Aug. 2007 URL: http://optics.org/cws/article/industry/30803 (2 pages).

USPTO U.S. Appl. No. 12/432,434, filed Apr. 29, 2009, Inventors: William H. Havens, Chen Fang, Ynjiun P. Wang.

USPTO U.S. Appl. No. 12/432,517, filed Apr. 29, 2009, Inventors: William H. Havens, Ynjiun P. Wang.

USPTO U.S. Appl. No. 12/432,534, filed Apr. 29, 2009, Inventors: William H. Havens, Timothy P. Meier, Ynjiun P. Wang.

USPTO U.S. Appl. No. 12/540,075, filed Aug. 12, 2009, Inventors: William H. Havens, Timothy P. Meier.

* cited by examiner

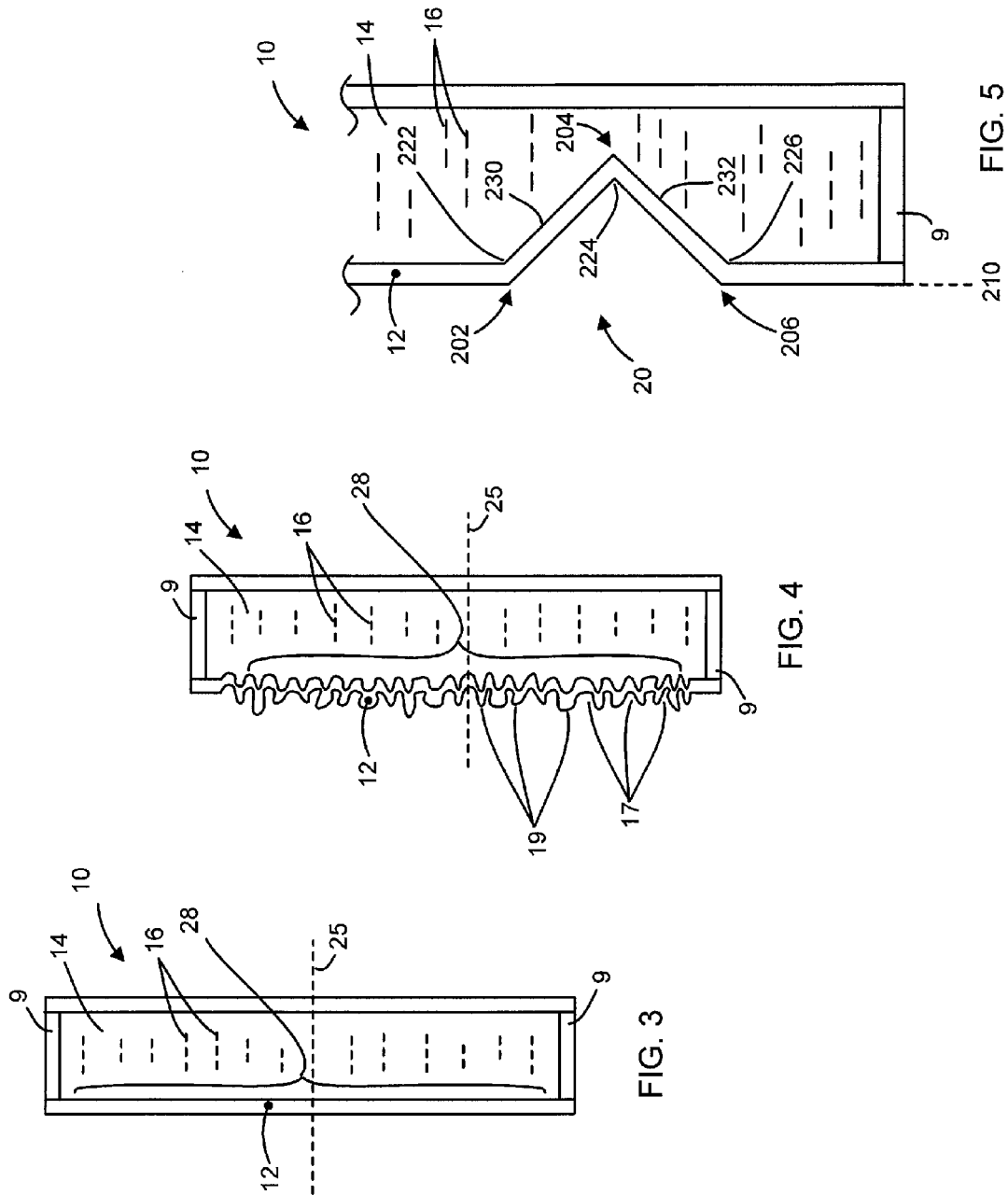

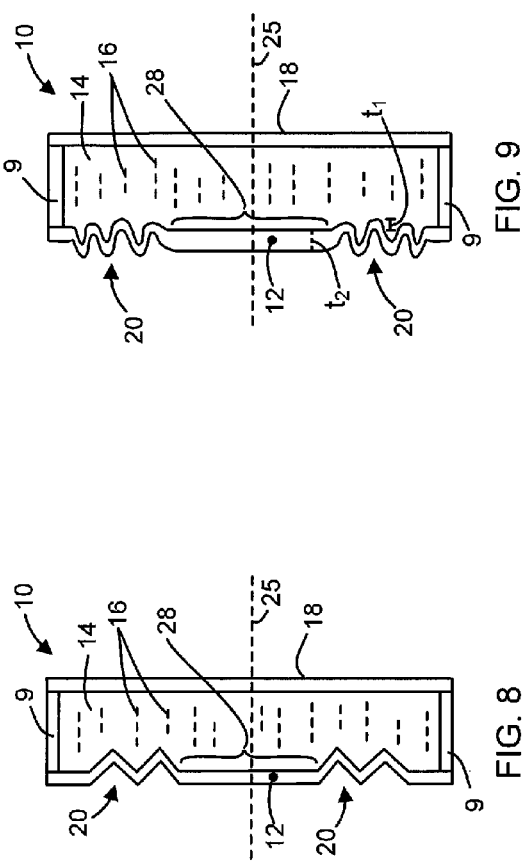
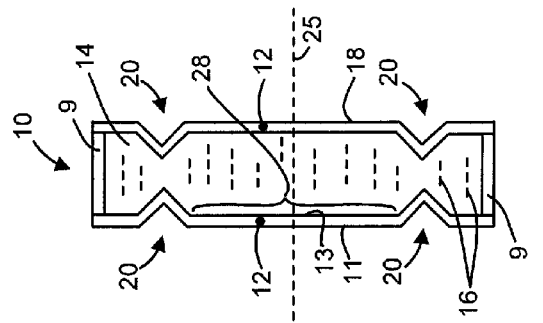
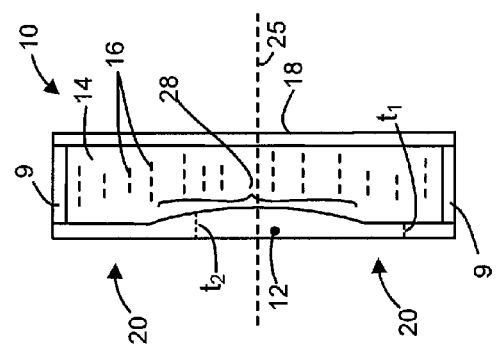

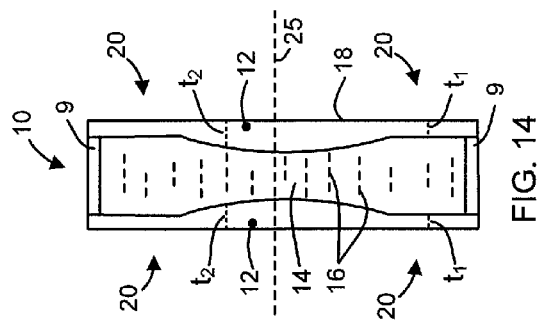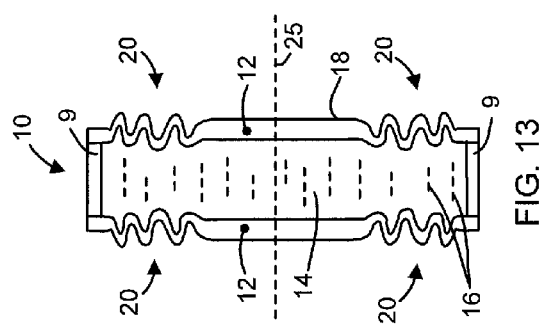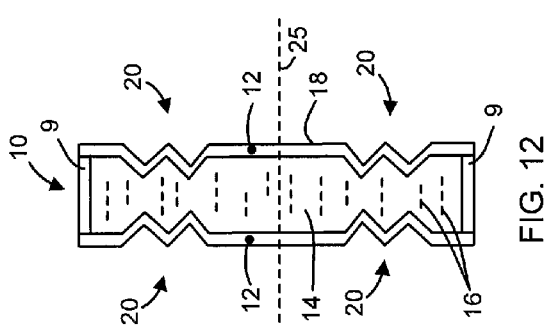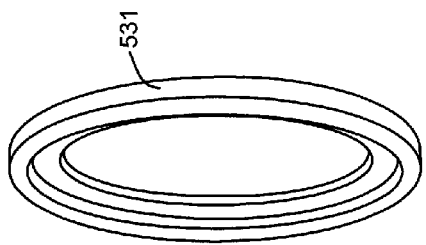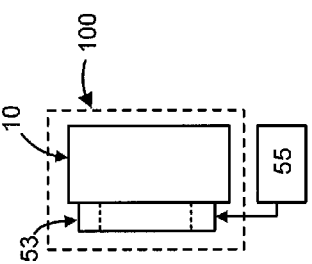

| TEMP | LENS SETTING | | |
|---|---|---|---|
| | 6" | 20" | 34" |
| (-40)-0 | $P_{0N}$ | $P_{0I}$ | $P_{0F}$ |
| 0 - 40 | $P_{1N}$ | $P_{1I}$ | $P_{1F}$ |
| 40 - 80 | $P_{2N}$ | $P_{2I}$ | $P_{2F}$ |
| 80 - 120 | $P_{3N}$ | $P_{3I}$ | $P_{3F}$ |
| 120 - 160 | $P_{4N}$ | $P_{4I}$ | $P_{4F}$ |

FLUID LENS ELEMENT FOR USE IN CHANGING THERMAL OPERATING ENVIRONMENT

FIELD OF THE INVENTION

The present invention relates in general to optical systems and specifically to optical systems having optical characteristics that can be varied.

BACKGROUND OF THE INVENTION

Fluid lens element based optical systems have been proposed for use in applications in which optical characteristics of an optical system are varied.

In a fluid injection based fluid lens element, a light transmissive expandable container containing fluid is provided in combination with a pump and a reservoir. Fluid is pumped into and drawn out of the expandable container to change an optical characteristic of the defined lens element.

One challenge that has been noted with respect to use of fluid lens element based optical systems is to account for changes in optical characteristics of a fluid lens element based optical system brought about by changes in temperature. Most materials tend to expand at higher temperature and optical materials for use in fluid lens elements are no exception. Optical systems can find use in operating environments in which temperatures can range from subfreezing to industrial environments in which temperatures of over 100° F. are common.

SUMMARY OF THE INVENTION

There is provided a lens element configured so that optical characteristics thereof remain substantially stable over a range of operating temperatures. In one embodiment, a fluid lens element can be provided that includes a membrane having a formation formed thereon for accommodating changes in characteristics of the lens element attributable to changes in temperature so that an amount of perturbations in the lens element which would otherwise be exhibited with thermal expansion of the membrane are minimized.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 3 is a side view of the lens element in another embodiment;

FIG. 4 is a side view of the lens element as shown in FIG. 3 experiencing member thermal expansion;

FIG. 5 is an enlarged partial side view of the lens element as shown in FIGS. 1 and 2;

FIG. 8 is a side view of a lens element having a formation in another embodiment;

FIG. 9 is a side view of a lens element having a formation in another embodiment, the formation including a sinusoidal pattern;

FIG. 10 is a side view of a lens element having a formation in another embodiment, the formation including a smaller thickness than a thickness at a light ray transmitting region of a membrane defining the formation;

FIGS. 11-14 are side views of lens elements having opposing light transmissive members provided by a formation including a deformable membrane;

FIG. 15 is a schematic diagram of a focusing apparatus including an actuator assembly;

FIG. 16 is a perspective view of a ring shaped member;

DETAILED DESCRIPTION OF THE INVENTION

Figure 2:
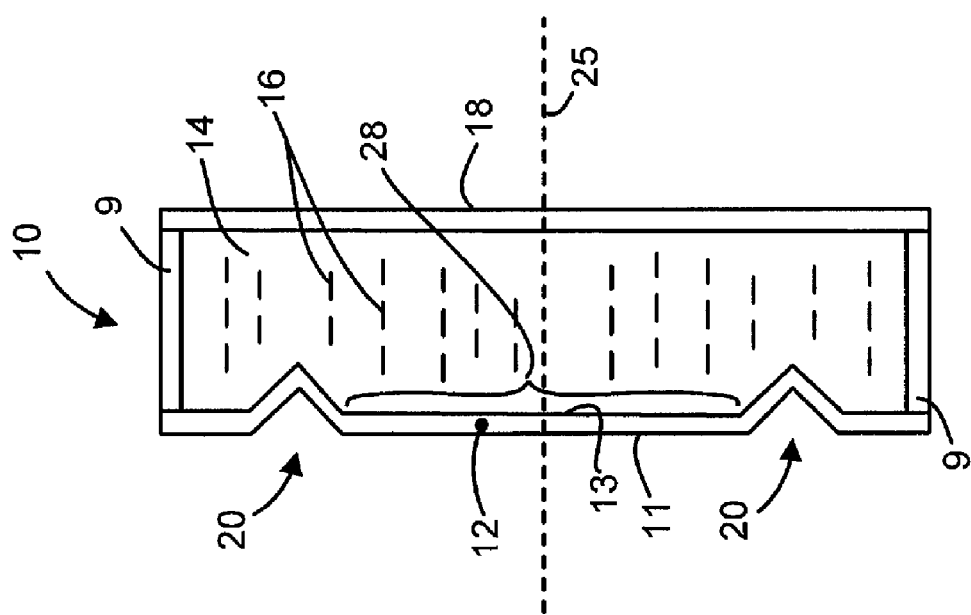
FIG. 2 is a side view of the lens element as shown in FIG. 1.
Figure 1:
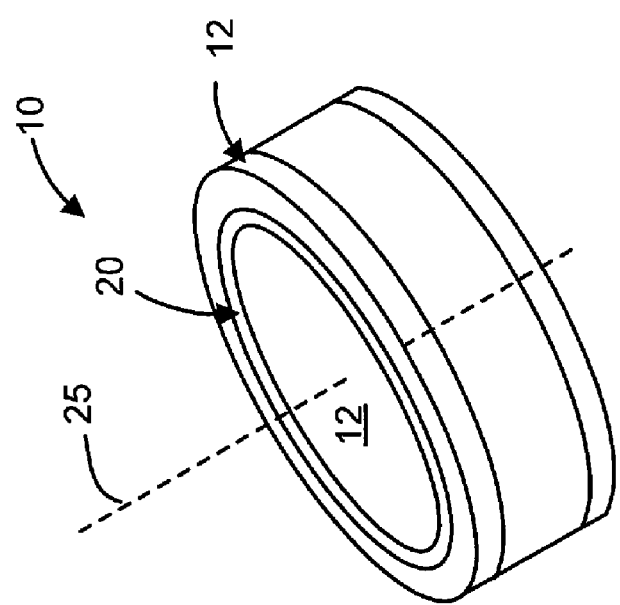
FIG. 1 is a perspective view of a lens element showing a membrane formation for encouraging preferential deformation of the membrane.

Referring to FIGS. 1 and 2, there is shown a perspective and cross sectional side view respectively of a fluid lens element 10. Fluid lens element 10 can include a light transmissive deformable membrane 12 and a cavity 14 holding optical fluid 16, delimited on one side by deformable membrane 12 and on opposite side by light transmissive member 18. Light transmissive member 18 can be provided by a solid light transmissive material with or without optical power or by a deformable membrane capable of exhibiting curvature for definition of a lens surface having optical power. Deformable membrane 12, light transmissive member 18, and optical fluid 16 can define an imaging axis 25. Fluid lens element 10 can include spacer 9 providing spacing between deformable membrane 12 and light transmissive member 18. Spacer 9 can optionally be deleted. In another embodiment, spacer 9 can be deleted (e.g., membrane 12 and member 18 can be provided to have convex profiles and can be joined together at their respective peripheries). When force is imparted to a deformable surface of lens element 10, an optical characteristic of lens element 10 can change. In one example, a force can be imparted to an external surface 11 of membrane 12. In another example, a force can be imparted to an internal surface 13 of membrane 12, e.g., by pumping fluid into or out of a cavity 14 of lens element 10. Lens element 10 can be deployed alone as a lens assembly or deployed in series with other lens elements in the formation of a lens assembly. In one embodiment, light transmissive member 18 is light transmissive throughout an entire area thereof.

A fluid containing lens element 10 as shown in FIGS. 1 and 2 is susceptible to changes in surface curvature thereof resulting from temperature changes. For example, if a temperature of fluid 16 increases, the fluid will tend to expand to change a curvature of membrane 12. Also, membrane 12 can expand as a result of a temperature increase.

Referring to lens element 10, lens element 10 can be constructed so that a curvature of membrane 12 changes minimally in response to environmental temperature changes. Specifically, as will be described herein, membrane 12 can include a formation 20 allowing a surface area of membrane 12 to expand with temperature increases, while reducing an amount of surface perturbations which would be exhibited by the membrane in an absence of the formation.

An amount of curvature change of membrane 12 is a function of an amount of volume change $\Delta V$ of fluid 16. A change in volume, $\Delta V$ of fluid 16 is a function of an initial volume, $V_0$, and a volume temperature expansion coefficient, $\gamma$. A change in volume of a fluid can be given by:

$$\Delta V = V_0(1+\gamma \Delta T) \quad \text{Equation 1}$$

It is seen that a change of curvature of membrane 12 will be a function of a change in volume $\Delta V$; this is $\Delta C = f(\Delta V)$.

Accordingly, it is seen that as part of a method for reducing a change in curvature, $\Delta C$, a change in volume, $\Delta V$ of a lens fluid 16 can be reduced. A small initial volume, $V_0$, and selection of a fluid having a small volume temperature expansion coefficient, $\gamma$, can assist in the formation of a lens element having a small curvature change, $\Delta C$, over a range of temperatures.

In a similar fashion consider a very thin, (thickness $<<A_0$) sheet of material. As the temperature changes, the surface area of this sheet will expand and contract by:

$$\Delta A = A_0(1+\beta)T \quad \text{Equation 2}$$

where $\beta$=surface area temperature expansion coefficient where $A_0$ is the initial area of the membrane, and $\Delta A$ is the change in area.

For a given material, the volume, area and linear temperature expansion coefficients can be shown to be approximately interrelated as:
 $\alpha$=linear temperature expansion coefficient
 $\beta$=area temperature expansion coefficient
 $\gamma$=volume temperature expansion coefficient
 $\beta=2\alpha$
 $\gamma=3\alpha$ Thus for the case where two different materials have common linear temperature expansion coefficients, they can be expected to respond to temperature changes in a homogeneous fashion, otherwise one can expect the materials to respond with differential changes in one form or another.

It was determined that an undesired lens element change can result not only from thermal expansion of fluid 16, but from thermal expansion of membrane 12. In fact, it was determined that for some desirable membrane and optical fluid combinations, the thermal expansion of membrane 12 can have a greater effect than the thermal expansion than that of the fluid 16. Where a linear temperature expansion coefficient of membrane 12 is greater than the linear temperature expansion coefficient of the fluid 16, the fluid lens element 10 can be susceptible to exhibiting surface perturbations such as resulting from expansions of membrane 12 without a corresponding expansion of a volume of optical fluid 16.

FIG. 3 shows an exemplary fluid lens element 10 devoid of formation 20 with a membrane material having a higher linear temperature expansion coefficient than the linear temperature expansion coefficient of the optical fluid. In the view of FIG. 3, lens element 10 is shown in a state prior to being subject to operating temperatures resulting in thermal expansion. Membrane 12 of lens element 10 can include region 28 adapted for transmission of image forming light rays.

FIG. 4 shows the fluid lens element of FIG. 3 after thermal expansion of membrane 12 produces an expansion of a surface area of lens element 10 without a corresponding change in the volume of lens fluid 16. If membrane 12 expands without fluid 16 expanding, the surface area has to change while the internal fluid is non-compressible. The result is that surface perturbations of deformable membrane 12 can be expected to occur under the constraint of an unchanging volume.

A surface perturbation as used in the context herein can be regarded as an unwanted optical feature that causes deviation of image forming light rays transmitted by lens element 10 from an intended path. A surface perturbation of deformable membrane 12 can comprise an optical feature that causes the profile of the deformable membrane to deviate from an axial symmetric profile. An amount of surface perturbation occurring in membrane 12 can be expected to increase with an increase in temperature in the case where a linear coefficient of thermal expansion of membrane 12 is greater than a linear coefficient of thermal expansion of fluid 16. An amount of surface perturbation exhibited by membrane 12 can be expected to decrease with a decrease in temperature in the case where a linear coefficient of thermal expansion of membrane 12 is less than a linear coefficient of thermal expansion of fluid 16. Where lens element 10 is incorporated in an image sensor based terminal, image forming light rays transmitted by lens element 10 can be projected onto an image sensor array. Where lens element 10 is incorporated in laser scanning terminal, image forming light rays transmitted by lens element 10 can be directed toward a target for projection of an image of a laser light source onto a target.

An amount of perturbation of deformable membrane 12 can increase with an increase in one or more of a size or incidence of optical features in a membrane that contributes to deviation of transmitted light rays from an intended image forming path. An amount of surface perturbation of deformable membrane 12 can decrease with a decrease in one or more of a size or incidence of optical features of a membrane that contribute to deviation of transmitted light rays from an intended image forming path.

Without thermal expansion, image forming light rays transmitted through deformable membrane 12 can follow a first path. When membrane 12 exhibits thermal expansion, optical features can occur on membrane 12 to cause deviation of transmitted light rays from the first path. In one example, a portion of membrane 12 can bulge outward, but since the expansion is not accompanied by a corresponding expansion of fluid volume, a portion of membrane 12 is also likely to depress, rendering it a highly irregular lens structure, as shown in FIG. 4 having a complex combination of concave lenslet 17 and convex lenslet 19 optical features superimposed over a generally axial symmetry curvature of membrane 12 (membrane 12 can have a concave general curvature, convex general curvature, or can be flat) destroying the axial symmetry of the membrane. As will be set forth with reference to particular examples, an amount of surface perturbation exhibited in an intended imaging light transmitting region can be reduced by providing a formation 20 that will allow the surface area of the membrane 12 to expand under the constraint so that the overall internal volume of lens element 10 will not change. For purposes of analysis, two dimensional solutions will be considered recognizing that these concepts may be extended to three dimensions with appropriate manipulation and scaling.

Surface perturbations as shown in FIG. 4, in one embodiment, as noted are undesirable. However, in another embodiment such perturbations are desirable. In one embodiment, heat can be selectively applied to membrane 12 as shown in the embodiment of FIGS. 3 and 4 to selectively switch a light shaping function of membrane 12 from a first image forming function as shown in FIG. 3 to a light diffusing function. FIG. 4 shows membrane 12 in a state at which membrane 12 can be operative to provide a light diffusing function.

Surface perturbations can take numerous forms. One example of a surface perturbation is an optical feature in the form of an unwanted concave or convex lenslet operating to diffuse image forming light rays displacing image forming light rays from an intended image forming path.

Referring to formation 20 as shown in FIGS. 1 and 2, formation 20 allows the surface area of membrane 12 to expand while reducing an amount of surface perturbation exhibited in lens element 10 resulting from thermal expansion of membrane 12, relative to an amount of surface perturbation that would be expected to be exhibited in an absence of the formation 20. A formation 20 as further described in FIG. 5 can be of generally accordion structure, and can include folds 202, 204, and 206 formed at corners 222, 226, and apex 224 as seen in the cross-sectional view of FIG. 5. Folds 202, 204, and 206 can be of such construction that during periods of expansion of membrane 12, membrane 12 will preferentially bend at folds 202, 204, and 206. Folds 202, 204, and 206 can be formed by casting or injection molding of an elastomer material using a mold in which folds 202, 204, 206 are pre-formed. In another aspect, formation 20 can be formed at a location on membrane 12 other than a region 28 of membrane 12 adapted for transmission of imaging light rays. In the embodiment of FIGS. 1 and 2, formation 20 delimits intended image forming light ray transmitting region 28 of membrane 12. Membrane 12 including formation 20 as shown and described in connection with FIGS. 1-2, and 5-7 can be provided utilizing a casting or an injection molding process wherein a mold cavity is shaped so that the folds of membrane 12 at corner 222, corner 226 and apex 224 are pre-formed.

In another aspect of formation 20, as best seen in FIG. 5, formation 20 can be of generally accordion construction. To define formation 20, membrane 12 can fold inward from a major surface of plane 210 at inner corner 222 and outer corner 226 to define arms 230, 232. Arms 230, 232 can be joined at apex 224. Membrane 12 can be of unitary construction comprising a single piece of material. Membrane 12 can comprise a light transmissive elastomeric material. An example of a commercial product which can be used as a membrane for membrane 12 is Dow Corning SLYGARD® 184.

Figure 7:
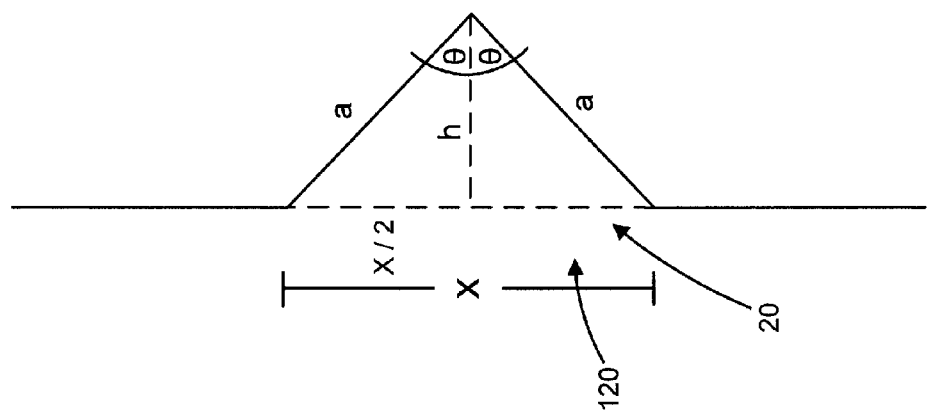
FIGS. 6 and 7 are line diagrams of a lens element for illustrating a configuration element thereof.
Figure 6:
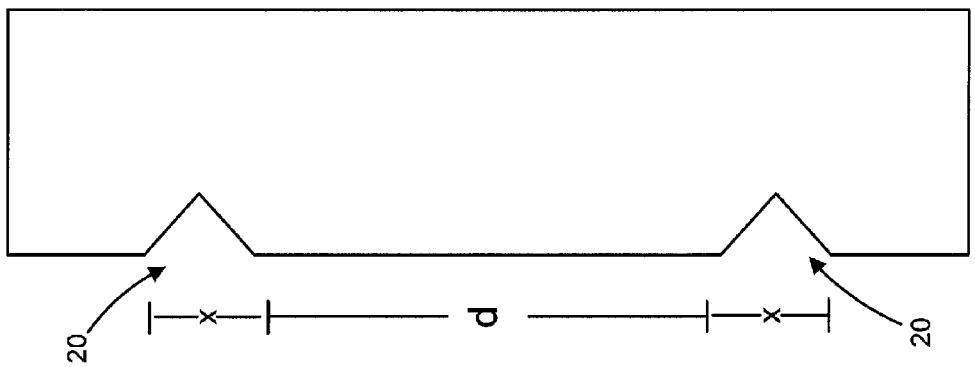

Line representations of lens element 10 as shown in FIGS. 1 and 2 are provided in FIGS. 6 and 7 for purposes of accompanying descriptions of certain design considerations. It will be observed that the profiles of FIGS. 6 and 7 have the same analytical features as the profiles in FIGS. 1 and 2. Further, as long as the dimensions of the formation 20 are small relative to the separation, d, then to the extent that the dimension x can change while satisfying the constraint that the area of the triangular profile 120 changes minimally, then the change in the area of the surface can be expected to be accommodated without creating the surface perturbations as shown in FIG. 4.

The area of the triangular profile 120 is given as $$A = 2(1/2h(x/2))$$ Equation 3

Expressing h in terms of x according to the Pythagorean theorem $$h = \sqrt{a^2 - \left(\frac{x}{2}\right)^2}$$ Equation 4

Thus the area of triangular profile 120 is given as $$A = \frac{x}{2}\sqrt{a^2 - \left(\frac{x}{2}\right)^2} = \frac{x}{4}\sqrt{4a^2 - x^2}$$ Equation 5

It can be shown from differential calculus that if there is a condition under which the area of triangular profile 120 has either a maximum or minimum for small changes in x, then this would be the special case when the first derivative of the area with respect to x is identically zero. This gives $$0 = \frac{dA}{dx} = \frac{1}{4}\left(\frac{1}{2}\right)\frac{(8a^2x - 4x^3)}{\sqrt{4a^2x^2 - x^4}}.$$ Equation 6 leading to the solution $$a = x_0/\sqrt{2}$$ Equation 7

Where $x_0$ is the length dimension of the base in an unstressed state. Thus the height of the triangular profile 120 will be given as $$h = x_0/2$$ Equation 8 or alternately the height of the triangular feature is half the base of the feature.

A fluid membrane designed with formation 20 having a height, h, that is equal to half the nominal base width will have a reduced sensitivity to surface expansion and thus will have reduced surface distortions brought about by changes in temperature.

Accordingly, when a is $$\frac{\sqrt{2}}{2}$$

times the length, $x_0$, of the base in an unstressed state, the volume will change minimally as the length of the base changes. The subtended angle, Θ, can be expressed as $$\text{SIN}\Theta = \left(\frac{x_0}{2}\right)\frac{1}{x_0\frac{\sqrt{2}}{2}} = \frac{1}{\sqrt{2}} = 0.707$$ Equation 9

Accordingly,
Θ=45°

Accordingly, a minimal volume change, ΔV, will be provided where Θ=45° for the formation 20. Therefore, a structure then produces minimum volume and curvature changes with changes in temperature will be provided by maintaining the angle between about 30° and 60° and preferably about 45°. It will be observed that this is the special case when the vertex angle between the two equal sized legs is 90 degrees.

Reference will now be made to additional alternative embodiments of lens elements operative so that an amount of surface perturbation of a lens membrane occurring at a region thereof adapted for transmission of image forming light rays is reduced.

In the embodiment of FIG. 8, formation 20 radially disposed about axis 25 includes a duplication of features for minimizing formations of surface perturbations as shown in the embodiment of FIGS. 1, 2, and 5-7. Accordingly, in the embodiment of FIG. 8, lens element 10 includes a pair of accordion features. Each of the accordion features in the embodiment of FIG. 8 can be constructed in accordance with the accordion feature described with reference to FIGS. 1, 2, and 5-7.

In the embodiment of FIG. 9, cross sectional formation 20 of lens element 10 does not include folds, but rather includes a sinusoidal pattern as shown. The sinusoidal pattern defining formation 20 can be provided by pre-forming the pattern via a casting process wherein a casting cavity is shaped so that the preferred sinusoidal features are included in a completed deformable membrane.

With further reference to the embodiment of FIG. 9, a casting cavity can be shaped so image forming light ray transmitting region 28 of membrane 12 is formed to include a thickness, $t_2$, at light ray transmitting region 28 of membrane 12 that is larger than a thickness, $t_1$, at the region of formation 20. During periods of thermal expansion of membrane 12, with a thickness of region 28 larger than that of formation 20, membrane 12 can be expected to preferentially deform via expansion at formation 20.

In the embodiment of FIG. 10, formation 20 of membrane 12 allows membrane 12 to preferably deform at a region of membrane 12 other than image forming light ray transmitting region 28 of membrane 12. The embodiment of FIG. 10 is similar to the embodiment of FIG. 9 in that membrane 12 is constructed to be relatively thicker at an image forming light ray transmitting region thereof, having a thickness $t_2$, at image forming light ray transmitting region 28 of membrane 12 that is larger than a thickness, $t_1$, at formation 20. The embodiment of FIG. 10 is similar to the embodiment of FIG. 9 in that membrane 12 in both embodiments has a smaller thickness at formation 20 than at light ray transmitting region 28. However, in the embodiment of FIG. 10, membrane 12 is devoid of a sinusoidal pattern. Nevertheless, the smaller thickness, $t_1$, of membrane 12 at a region therein that defines formation 20 in the embodiment of FIG. 10 results in membrane 12 preferentially deforming at formation 20. Membrane 12 in the embodiment of FIG. 10, as in previous embodiments of membrane 12, can be made by a casting process when a casting cavity is provided so that the formed membrane has a smaller thickness $t_1$ at formation 20 than a thickness $t_2$ at region 28. In one embodiment as shown in FIG. 10, an external surface of membrane 12 can be planar in an unstressed state, and an internal surface of membrane 12 can be convex in an unstressed state.

In the embodiments where a cross section side view of membrane 12 is shown and described, it is understood that membrane 12 can have axial symmetry so that the cross sectional side view is the same for membrane 12 at each possible cross sectional location.

With reference to FIGS. 11-13, it is shown that light transmissive member 18 of lens element 10 can be provided by a deformable membrane. In the embodiment of FIG. 11, light transmissive member 18 is provided by a deformable membrane 12 according to the embodiment as shown in FIGS. 1 and 2. In the embodiment of FIG. 12, light transmissive member 18 is provided by a deformable membrane 12 provided according to the embodiment as shown in FIG. 8. In the embodiment of FIG. 13, light transmissive member 18 is provided by a deformable membrane 12 as shown in the embodiment of FIG. 9. In the embodiment of FIG. 14, light transmissive member 18 is provided by a deformable membrane as shown in the embodiment of FIG. 10.

It has been described with reference to lens element 10 that when a linear coefficient of thermal expansion of membrane 12 is greater than that of fluid 16, an increase in temperature can cause an area of membrane 12 to expand without substantial expansion of the volume of fluid 16. It will be understood that the same effect will also occur (membrane 12 expanding without substantial expansion of fluid 16) where fluid 16 has a linear coefficient of thermal expansion greater than that of membrane 12, and a temperature in the environment of lens element 10 is reduced. In various embodiments described, fluid lens element 10 can be a deformable fluid lens element including a deformable membrane 12. In another embodiment, a fluid lens element 10 can be provided by an electrowetting type fluid lens having a plurality of immiscible fluids.

Figure 18:
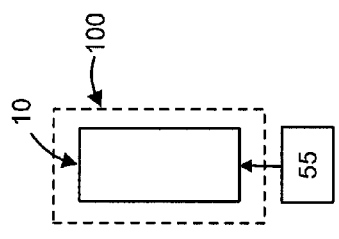
FIG. 18 is a schematic diagram of a variable lens element system having a focusing apparatus including an electrowetting type fluid lens element.
Figure 17:
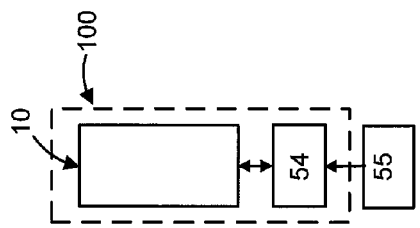
FIG. 17 is a schematic diagram of a variable lens element system having a focusing apparatus including a pump.

Energy can be input to lens element 10 to change an optical characteristic of lens element 10 e.g., focal length, plane of nominal focus. Lens element 10 in combination with additional elements that render optical characteristics of lens element 10 capable of being changed can be regarded as a focusing apparatus 100. In the embodiment of FIG. 15, a focusing apparatus 100 can be regarded as including fluid lens element 10 as described herein including at least one deformable membrane 12 in combination with actuator assembly 53. Actuator assembly 53 in the embodiment of FIG. 15 can include e.g., an electrochemical muscle actuator, a piezoelectric actuator, or a voice coil and can further comprise a ring shaped member operative so that when the ring shaped member imparts a force on membrane 12, an area of membrane 12 about axis 25 bulges outward. A ring shaped member 531 that can be incorporated as part of actuator assembly 53 for imparting a force on a deformable membrane 12 is shown in FIG. 16. In the embodiment of FIG. 17, a focusing apparatus 100 can comprise a pump 54 in combination with lens element 10. In the embodiment of FIG. 17, pump 54 can pump fluid into or out of a lens cavity 14, as has been described with reference to various embodiments of lens element 10. In the embodiment of FIG. 18, focusing apparatus 100 can include a fluid lens element 10 in the form of an electrowetting fluid lens element having a plurality of immiscible lens fluids. In the embodiment of FIG. 18, fluid lens element 10 can be devoid of deformable membrane 12. In each of the embodiments of FIGS. 15, 17, and 18, an electrical power input unit 55 can be provided in association with the focusing apparatus 100 for supplying input electrical power for changing an optical characteristic of fluid lens element 10. In the embodiment of FIG. 15, electrical power input unit 55 provides input power to actuator assembly 53. In the embodiment of FIG. 17, electrical power input unit 55 provides input power to pump 54. In the embodiment of FIG. 18, electrical power input unit 55 provides input power to fluid lens element 10, which the embodiment of FIG. 18 can be provided by an electrowetting type fluid lens element having a plurality of immiscible fluids.

Figure 19:
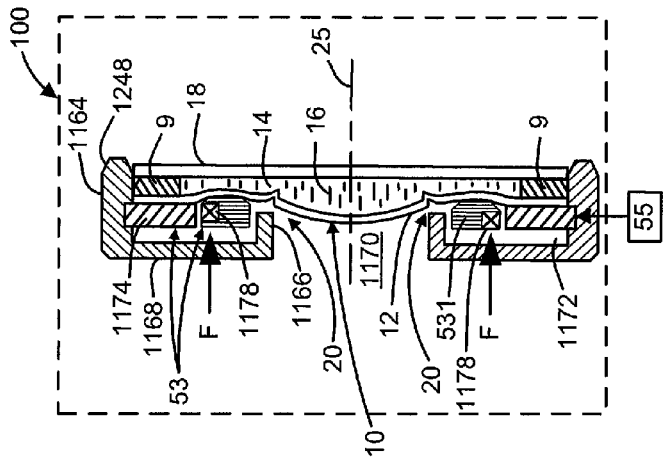
FIG. 19 is a physical form view of a focusing apparatus in combination with an electrical power input unit, wherein the focusing apparatus comprises an actuator assembly that includes a voice coil.

A physical form view of an exemplary focusing apparatus 100 in accordance with the embodiment of FIG. 15 is shown in FIG. 19. In the illustrated example, actuator assembly 53 includes a voice coil actuator which can comprise permanent magnet 1174 and wire coil 1178. A housing 1248 defines a cylindrical outer wall 1164 and a cylindrical inner post 1166 joined by a back plate 1168. The inner post 1166 can be hollow, forming a center bore 1170 aligned with the optical axis 25, through which the light rays pass. The housing 1248 further defines an interior region 1172 formed therein to capture and hold the voice coil components, namely, permanent magnet 1174 and wire coil 1178. Within the interior region 1172 in the described embodiment, a permanent magnet 1174 is secured to the inner diameter of the outer wall 1164. A ring shaped member 531 having disposed therein a wire coil 1178 floats within the remaining interior region 1172. The deformable surface of membrane 12, spacer 9, and light transmissive member 18 in the described embodiment are secured to inner diameter of outer wall 1164. A focus fluid having an index of refraction greater than 1.0 may be disposed in the cavity 14. Technologies that are disclosed in U.S. patent application Ser. No. 12/432,480, entitled "FOCUSING APPARATUS AND TERMINAL COMPRISING VARIABLE FOCUS LENS ASSEMBLY" filed concurrently herewith, and incorporated herein by reference in its entirety (including focusing apparatus technologies) can be used with systems, apparatuses, and methods described herein.

In operation, an appropriate electric current is passed through the wire coil 1178 for generation of a magnetic field. The magnetic field interacts with the magnetic field induced by the permanent magnet 1174 according to the Lorentz law, imparting a driving force F at right angles to both the direction of the current and magnetic flux. In the disclosed embodiment, the force F is imparted in a direction substantially parallel with the axis 25 as shown by the arrow in FIG. 21. Further, to prevent plastic deformation and wear to those portions of the deformable membrane 12 that transmit light rays, the ring shaped member 531 is adapted to impart the force F at a continuum of force impartation points formed in an area pattern offset from axis 25. The force is imparted in an area pattern offset from axis 25 because otherwise, repeated cycling of the membrane 12 by a direct force within the optical path may alter the optical characteristics of membrane 12 over time, which is undesirable.

The amount of force F can be directly proportional to the current passing through wire coil 1178. The force F can cause the ring shaped member 531 to move in a direction along the axis 25. The ring shaped member 531 presses the deformable surface of deformable membrane 12 causing a bulging of the deformable membrane 12 in a manner to create a convex lens surface. In the embodiment shown, the deformable membrane 12 is configured to deform along a direction opposite to the direction of the force F. In this manner, the convex surface of the deformable membrane 12 can be configured to take advantage of the difference in indices of refraction between deformable membrane 12 and an adjacently disposed substance, as will be explained in detail below. Due to the nature of voice coil design, extremely accurate movements can be achieved in very small time periods, allowing variable focus distance lens element 10 to be regulated with great precision.

Figure 21:
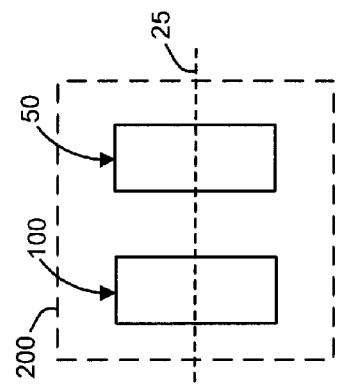
FIG. 21 is an embodiment of a variable lens assembly having a focusing apparatus and an additional optical element in series with the focusing apparatus.
Figure 20:
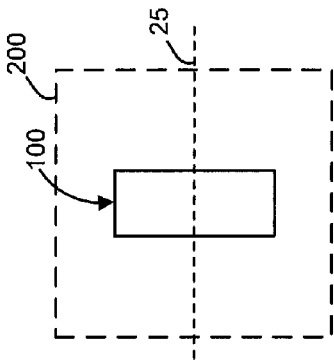
FIG. 20 is an embodiment of a variable lens assembly having a focusing apparatus.

Focusing apparatus 100 can be employed alone or in combination with other optical elements to define a lens assembly 200. Variations of lens assembly 200 comprising focusing apparatus 100 are shown in FIGS. 20 and 21. In the embodiment of FIG. 20, lens assembly 200 comprises focusing apparatus 100. In the embodiment of FIG. 21, lens assembly 200 comprises focusing apparatus 100 and additional optical element 50. Additional optical element 50 can comprise, e.g., a focusing apparatus including a deformable fluid lens element, a focusing apparatus including an electrowetting fluid lens element, or a traditional non-deformable solid (e.g., glass, polycarbonate) lens element. In another embodiment, lens assembly 200 can comprise a plurality of additional optical elements.

Figure 22:
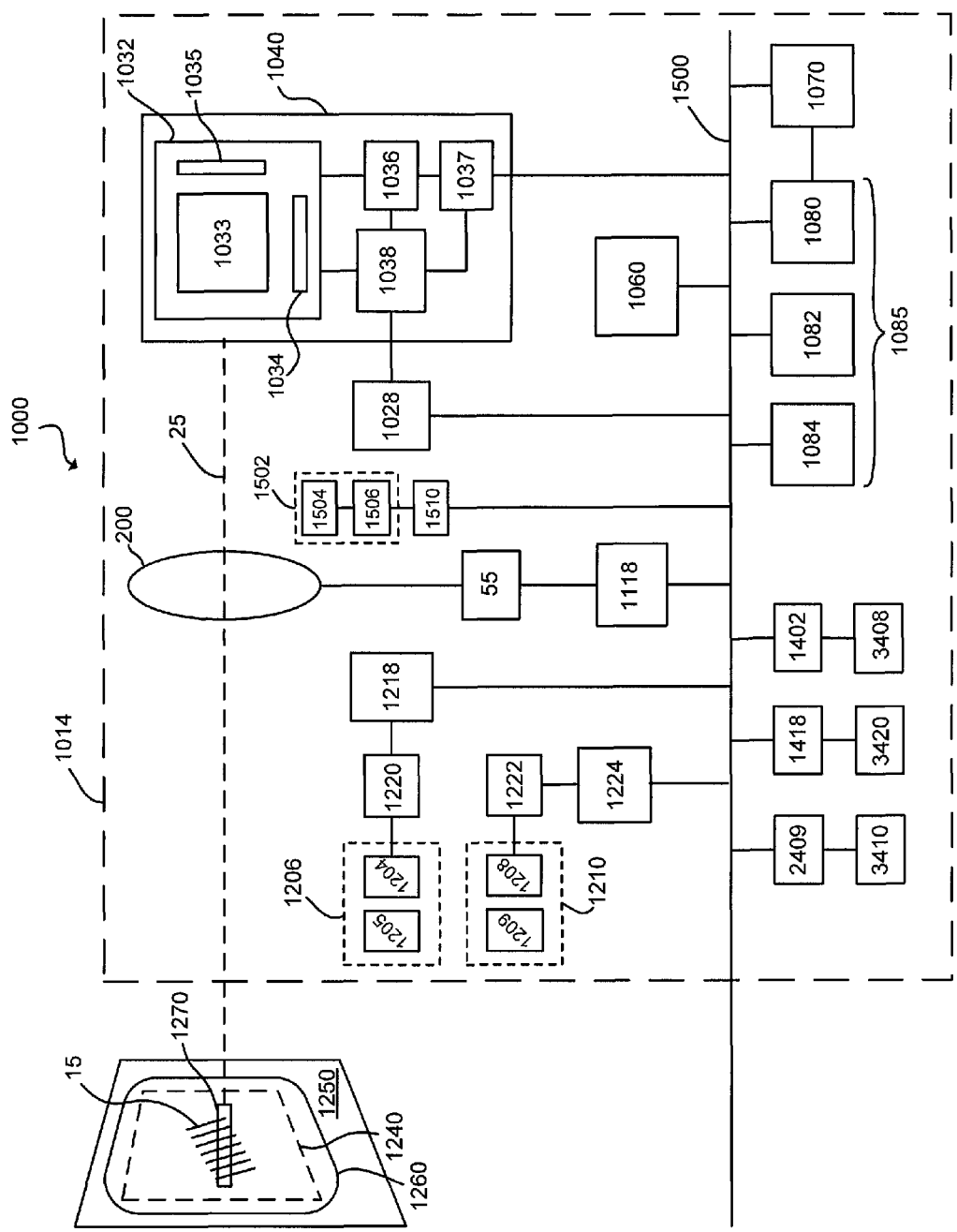
FIG. 22 is a block diagram of an image sensor based indicia reading terminal having a variable lens assembly.

In FIG. 22 there is shown a lens assembly 200 including lens element 10 disposed in an image sensor based indicia reading terminal 1000.

Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data.

In the course of operation of terminal 1000 image signals can be read out of image sensor 1032, converted and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, lens assembly 200 can be adapted for focusing an image of a decodable indicia 15 located within a field of view 1240 on a substrate 1250 onto image sensor array 1033. Imaging light rays can be transmitted about imaging axis 25. Lens assembly 200 can be adapted to be capable of multiple focal lengths and multiple best focus distances.

Terminal 1000 can also include an illumination pattern light source bank 1204 and associated light shaping optics 1205 for generating an illumination pattern 1260 substantially corresponding to a field of view 1240 of terminal 1000. The combination of bank 1204 and optics 1205 can be regarded as an illumination pattern generator 1206. Terminal 1000 can also include an aiming pattern light source bank 1208 and associated light shaping optics 1209 for generating an aiming pattern 1270 on substrate 1250. The combination of bank 1208 and optics 1209 can be regarded as an aiming pattern generator 1210. In use, terminal 1000 can be oriented by an operator with respect to a substrate 1250 bearing decodable indicia 15 in such manner that aiming pattern 1270 is projected on a decodable indicia 15. In the example of FIG. 20, decodable indicia 15 is provided by a 1D bar code symbol. Decodable indicia 15 could also be provided by a 2D bar code symbol or optical character recognition (OCR) characters. Each of illumination pattern light source bank 1204 and aiming pattern light source bank 1208 can include one or more light sources. Lens assembly 200 can be controlled with use of electrical power input unit 55 which provides energy for changing a plane of optimal focus of lens assembly 200. In one embodiment, an electrical power input unit 55 can operate as a controlled voltage source, and in another embodiment, as a controlled current source. Illumination pattern light source bank 1204 can be controlled with use of illumination pattern light source control circuit 1220. Aiming pattern light source bank 1208 can be controlled with use of aiming pattern light source bank control circuit 1222. Electrical power input unit 55 can apply signals for changing optical characteristics of lens assembly 200, e.g., for changing a focal length and/or a best focus distance of (a plane of optimum focus of) lens assembly 200. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a lumen of illumination output by aiming pattern light source bank 1208.

Terminal 1000 can also include a number of peripheral devices including trigger 3408 which may be used to make active a trigger signal for activating frame readout and/or certain decoding processes. Terminal 1000 can be adapted so that activation of trigger 3408 activates a trigger signal and initiates a decode attempt. Specifically, terminal 1000 can be operative so that in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). CPU 1060 can be operational to subject one or more of the succession of frames to a decode attempt. For attempting to decode a bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup.

Terminal 1000 can include various interface circuits for coupling various of the peripheral devices to system address/ data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling electrical power input unit 55 to system bus 1500, interface circuit 1218 for coupling illumination light source bank control circuit 1220 to system bus 1500, interface circuit 1224 for coupling aiming light source bank control circuit 1222 to system bus 1500, and interface circuit 1402 for coupling trigger 3408 to system bus 1500. Terminal 1000 can also include a display 3420 coupled to system bus 1500 and in communication with CPU 1060, via interface 1418, as well as pointer mechanism 3410 in communication with CPU 1060 via interface 2409 connected to system bus 1500.

A succession of frames of image data that can be captured and subject to the described processing can be full frames (including pixel values corresponding to more than about 80% of pixels of image sensor 1032). A succession of frames of image data that can be captured and subject to the described processing (e.g., frame quality evaluation processing) can also be "windowed frames" comprising pixel values corresponding to less than about 80%, and in some cases less than about 50% and in some cases less than 10% of pixels of image sensor 1032. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

In another aspect, terminal 1000 can include a temperature sensing assembly 1502 including a temperature sensor 1504 and an analog to digital converter 1506 for sensing a temperature of fluid containing lens element 10 of lens assembly 200. Temperature sensor 1504 can be disposed at or in proximity with fluid containing lens element 10 of lens assembly 200. CPU 1060 can be in communication with temperature sensor 1504 via interface 1510 coupled to assembly 1502 and system bus 1500.

Further regarding terminal 1000, an electrical power input applied by electrical power input unit 55 for establishing a desired lens setting can be responsive to a temperature sensed by sensor 1504. It has been mentioned that at higher temperatures a lens membrane and/or lens fluid can expand to result in changes in optical characteristics of the lens element. To compensate for the lens element characteristic changes resulting from thermal expansion, an electrical power input, applied by an electrical power input unit of electrical power input unit 55 for establishing a lens setting of lens assembly 200 can be varied.

Figures 23, 24:
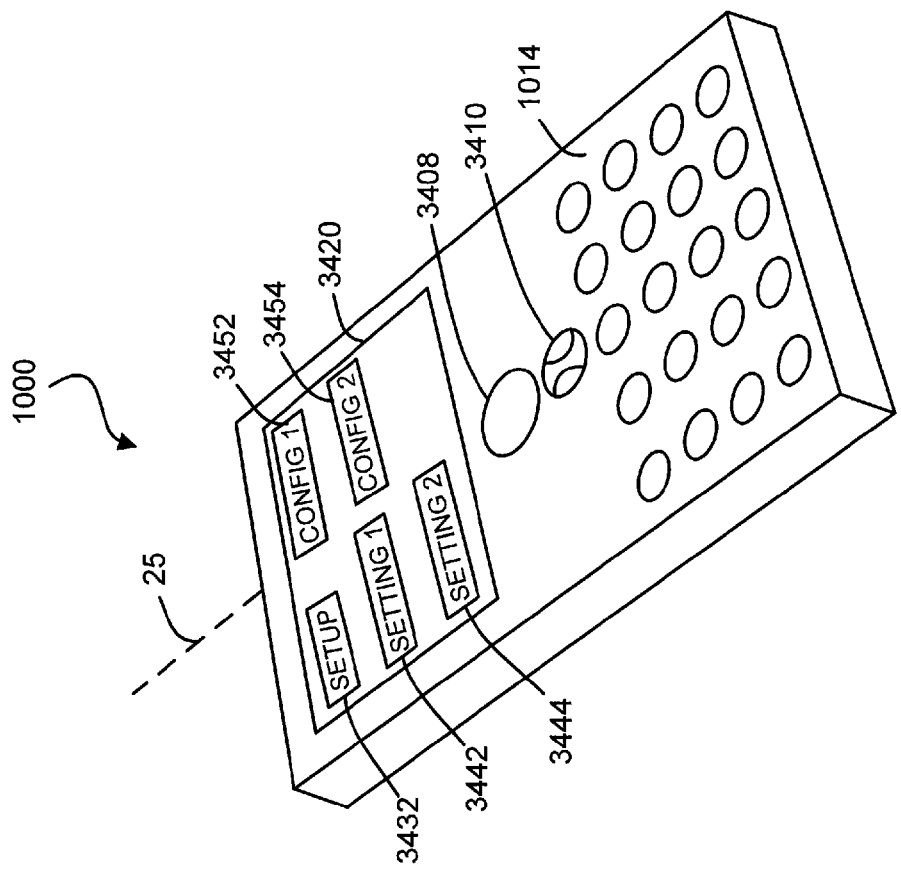
FIG. 23 is a perspective view of an indicia reading terminal having a hand held housing.
FIG. 24 illustrates a table for control of an indicia reading terminal.

A physical form view of terminal 1000 in one embodiment is shown in FIG. 23. Display 3420, trigger 3408, and pointer mechanism 3410 can be disposed on a common side of a hand held housing 1014 as shown in FIG. 23. Display 3420 and pointer mechanism 3410 in combination can be regarded as a user interface of terminal 1000. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor.

In another aspect, terminal 1000 can be operated in a set up mode selectable, e.g., by selection of button 3432 using a user interface of terminal 1000. The setup mode can be activated for determining power inputs corresponding to various lens assembly settings. In a setup mode, terminal 1000 can be operated at various temperatures and electrical power input can be varied until a desired reference lens setting is achieved. Terminal 1000 in one embodiment can be operative so that a setup mode can be activated by an end user operator of terminal 1000. In another embodiment, terminal 1000 can be operative so that the setup is restricted from being activated by an operator user and can only be activated by a manufacturer provider user. In one embodiment, terminal 1000 can be operative so that a setup mode can be activated prior to the incorporation of terminal components into housing 1014.

Repeating the process for several settings and sensed temperatures a control table 3490 as shown in FIG. 24 can be established. Once table 3490 is established, the setup mode can be deactivated by de-selection of button 3432 and operated in a run mode. In a run mode, terminal 1000 can operate according to a selected first or second configuration as described herein or according to another configuration. For establishing a certain (e.g., selected) lens setting when operating in run mode, terminal 1000 can utilize table 3490 correlating temperatures and settings to required power input for determining a power input level for establishing a certain lens setting.

Referring to terminal 1000, terminal 1000 can be operative to move a lens setting of lens assembly 200 between at least a first plane of optimum focus setting and a second plane of optimum focus setting. Indicia reading terminal 1000 can be operative to move a lens setting of the lens assembly between at least first and second different planes of optimum focus settings, and can further be operative to expose a first frame of image data with the lens assembly at the first plane of optimum focus setting and a second frame of image data with the lens assembly at the second plane of optimum focus setting, and the terminal can further be configured so that the terminal is operative to subject each of the first and second frames of image data to a decode attempt for decoding of a decodable indicia. The second frame can be a successive frame in relation to the first frame or a non-successive subsequent frame in relation to the first frame.

Terminal 1000 can be operative so that terminal 1000, when an operator activated read attempt is actuated by actuation of trigger 3408, can capture a succession of frames and subject one or more of the frames to a decode attempt until a time that the operator activated read attempt is deactivated, e.g., by release of trigger 3408 or a successful decode or a timeout condition being satisfied. In another aspect, terminal 1000 in a first operator activated configuration set forth herein can be operative to move a lens setting of the lens assembly between at least the first and the second lens settings of the lens assembly during a time that the terminal executes an operator activated read attempt of the terminal. Further, the terminal be operative so that first and second frames utilized for a decode attempt are frames exposed during a single operator activated read attempt of the terminal.

Terminal 1000 in a second operator activated configuration set forth herein can be operative to maintain a lens setting of the terminal at a certain lens setting during a time that the terminal executes an operator activated read attempt of the terminal. In addition, terminal 1000 can be operative to move a lens setting in accordance with an operator input command input subsequent to a first operator activated read attempt and prior to a second operator activated read attempt. Terminal 1000 can be further operative so that a first frame and a second frame utilized for a decode attempt are frames exposed during separate first and second separate operator activated read attempts of the terminal.

Terminal 1000 can have a user interface comprising a display 3420 and pointer mechanism 3410, and a user can utilize the user interface to select a lens setting by selection of a displayed button 3442, 3444 corresponding to the desired lens setting. Terminal 1000 can further be operative so that when trigger 3408 is active and to activate a read attempt, terminal 1000 maintains the lens setting at the selected lens setting through the capture of a plurality of frames, including the first and second frames when attempting to decode a decodable indicia in response to a trigger signal being made active to initiate a decode attempt with use of trigger 3408. An operator can select between a first configuration (lens setting moves during read attempts) and second configuration (lens setting is maintained through read attempts) using the user interface of terminal 1000 by selection of a button 3452 (first configuration, moving lens), or button 3454 (second configuration, fixed setting lens), corresponding to the desired configuration.

Further aspects of terminal 1000 in one embodiment are described with reference to the timing diagram of FIG. 25. The timing diagram of FIG. 25 illustrates terminal 1000 undergoing a change in configuration from a first configuration in which a variable lens of terminal 1000 is varied during a read attempt to a second configuration in which a variable lens of terminal 1000 remains at a fixed setting throughout a read attempt.

Figure 25:
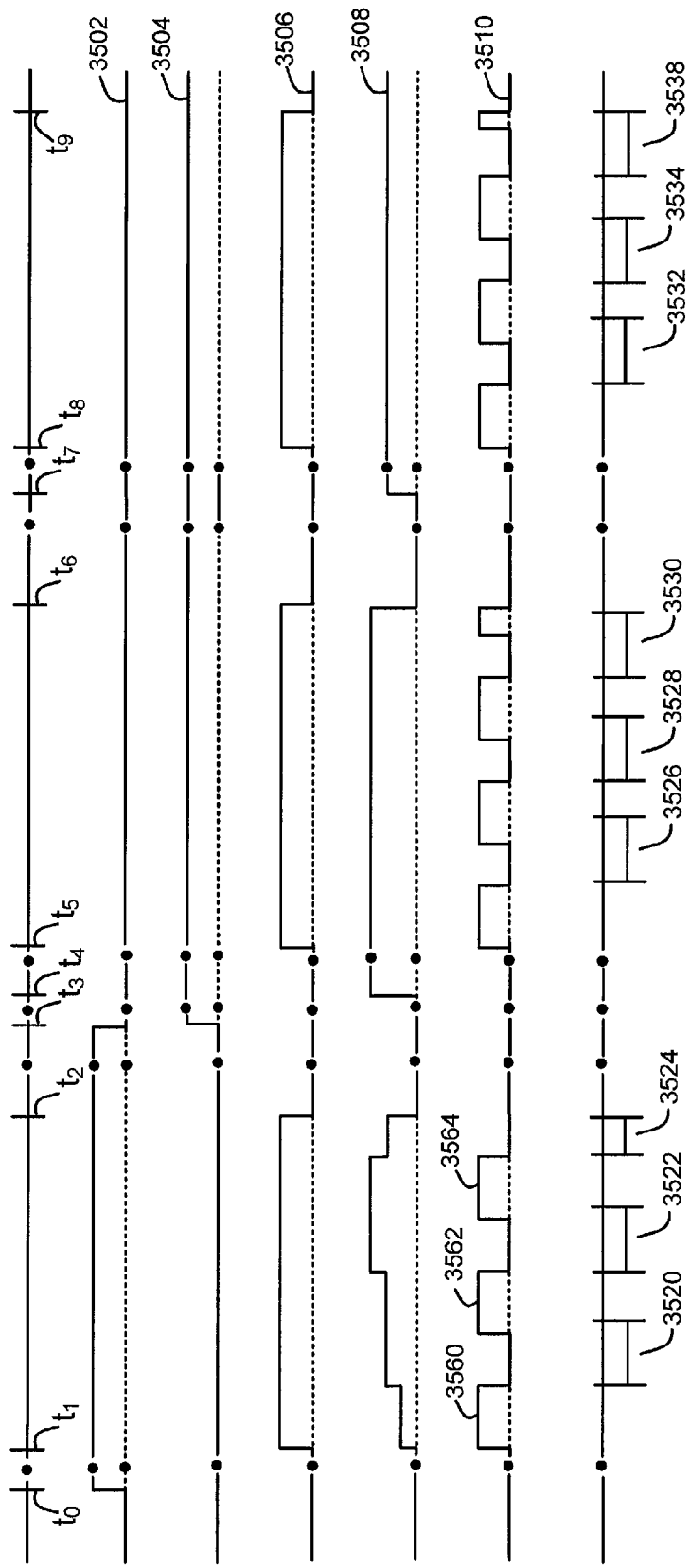
FIG. 25 is a timing diagram illustrating operational aspects of an indicia reading terminal.

Referring to the timing diagram of FIG. 25, signal 3502 is a state signal representing an active or inactive state of the first user selectable configuration. Signal 3504 is a state signal representing the state of a second described user selectable configuration. Signal 3506 is a trigger signal which can be made active by actuation of trigger 3408, and which can be deactivated by releasing of trigger 3408 which may become inactive after a time out period or after a successful decode of a decodable indicia. Signal 3508 represents an energy input level input into lens assembly 200 of terminal 1000. Signal 3510 is an exposure control signal. The exposure control signal transitions from active to inactive states. Exposure periods of terminal 1000 are represented by the active state periods of signal 3510.

Referring to processing periods 3520, 3522, 3524, 3526, 3528, 3530, 3532, 3534, 3538, the noted processing periods can represent processing periods during which time CPU 1060 of terminal 1000 processes stored (e.g., buffered) image data for attempting to decode a decodable indicia.

With further reference to the timing diagram of FIG. 25, an operator at time $t_1$ can select configuration 1 using e.g., button 3452 so that terminal 1000 is set in a configuration in which a lens setting of lens assembly 200 will vary during a read attempt. At time $t_1$, an operator can activate trigger signal 3506. In response to trigger signal 3506 being activated terminal 1000 can expose a plurality of frames of image data.

Referring to the timing diagram of FIG. 25, the energy input level input for establishing a setting of lens assembly 200 is represented by signal 3508 may be at different levels during each of respective exposure periods 3560, 3562, 3564 when terminal 1000 operates in a first (moving lens) configuration. At time $t_2$, trigger signal 3506 can be deactivated e.g., by successful decode or a release of trigger 3408. At time $t_3$, an operator can activate the second configuration as described herein e.g., by actuation of button 3454. Sometime thereafter, an operator may manually select a lens setting of lens assembly 200 e.g., by actuation of a lens setting button 3442, 3444 of terminal 1000 or other provided buttons if terminal 1000 is adapted so that further lens settings are available.

Referring to signal 3508, signal 3508 can be established at an energy level corresponding to the selected lens setting. At time $t_5$, a trigger signal 3506 can be activated again, e.g., by an operator actuation of trigger 3408. A plurality of exposure periods can ensue as seen by signal 3510. When operating in the second configuration, an energization input level into lens assembly 200 and therefore a setting of lens assembly 200 can remain constant. At time $t_6$, trigger signal 3506 can be deactivated e.g., by a release of trigger 3408 or by a successful decode of a message. At time $t_7$, with terminal 1000 still operating in the second configuration, an operator can move a lens setting to a different lens setting e.g., by using a lens setting selection button 3442, 3444 of terminal 1000. In response thereto, an energization level for input energy input into lens assembly 200 can be established at a level correlated to the setting as is seen by signal 3508. A trigger signal 3506 can thereafter be activated again at time $t_8$ and a plurality of exposure periods can ensue with a lens setting remaining at a setting corresponding to the constant lens setting energization level represented by signal 3508 as seen in timing the diagram of FIG. 25. Technologies that are disclosed in U.S. patent application Ser. No. 12/432,480, entitled "FOCUSING APPARATUS AND TERMINAL COMPRISING VARIABLE FOCUS LENS ASSEMBLY" filed concurrently herewith, and incorporated herein by reference in its entirety (including image sensor based terminal technologies) can be used with systems, apparatuses, and methods described herein.

Figure 26:
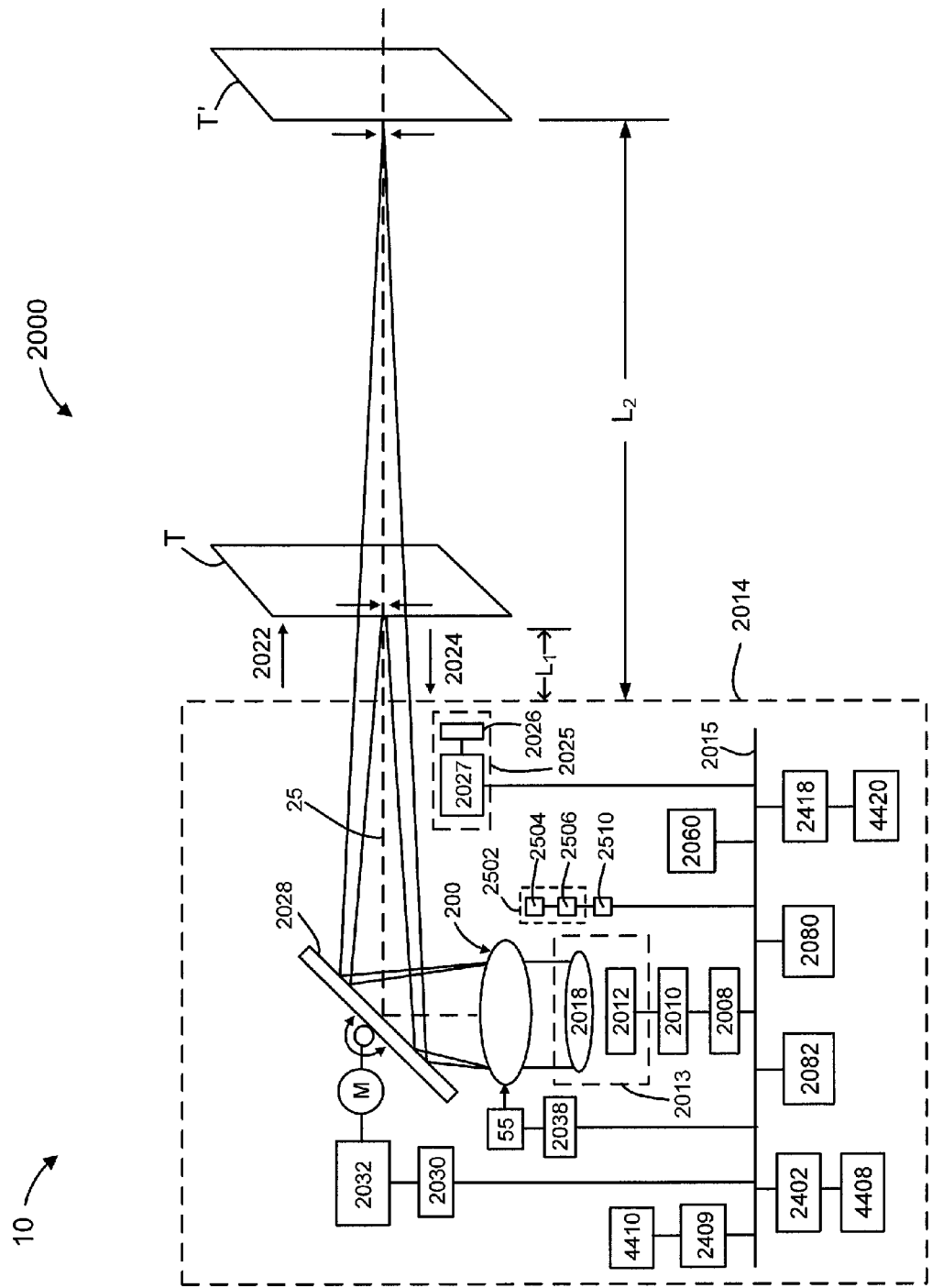
FIG. 26 is a block diagram of a laser scanning based indicia reading terminal having a variable lens assembly.

In FIG. 26 there is shown a lens assembly 200 including lens element 10 disposed in a terminal operative to define a laser scanner based indicia reading terminal 2000.

Referring to FIG. 26, an indicia reading terminal 2000 includes a laser source 2012 supported by a hand held housing 2014. The laser source 2012 can emit a laser beam along an optical path, or axis 25. Laser source 2012 can be coupled to laser source control circuit 2010. Light from laser source 2012 can be shaped by collimating optics 2018 and lens assembly 200. The combination of laser source 2012 and collimating optics 2018 can be regarded as a laser diode assembly 2013. The laser beam travels in an emitting direction 2022 along axis 25 and illuminates a target T, which in one embodiment includes a bar code. A scanning mirror reflector 2028 disposed within the optical path defined by axis 25 oscillates to direct the laser beam across the entire surface to be scanned. Reflector 2028 can be driven by scan motor, M, which is coupled to control circuit 2032.

The laser beam reflects off the target T and travels along axis 25 in a receiving direction 2024 back to a detector 2028. In the example wherein the target T includes a barcode, the incident laser light strikes areas of dark and white bands and is reflected. The reflected beam will thusly have variable intensity representative of the barcode pattern. Detector assembly 2025 including detector 2026 and analog to digital converter 2027 can receive the reflected beam of variable intensity, generate an analog signal corresponding to the reflected beam, and convert it to a digital signal for storage into memory 2080 where it can be processed by CPU 2060 in accordance with a program stored in non-volatile memory 2082, provided in a particular example by an EPROM.

For attempting to decode a bar code symbol, CPU 2060 can process a digitized image signal corresponding to a scanned, reflected, and detected laser beam to determine a spatial pattern of dark cells and light cells and can convert each light and dark cell pattern determined into a character of character string via table lookup. Terminal 2000 can include various interface circuits allowing CPU 2060 to communicate with various circuits of terminal 2000 including interface circuit 2008 coupled to circuit 2010 and system bus 2015, interface circuit 2030 coupled to motor control circuit 2032, and interface circuit 2038 coupled to electrical power input unit 55. Terminal 2000 can also include trigger 4408 which can be actuated to initiate a decode attempt. Manual trigger 4408 can be coupled to interface circuit 2402, which in turn can be coupled to system bus 2015. Terminal 2000 can also include a display 4420 in communication with CPU 2060 via interface 2418 as well as pointer mechanism 4410 in communication with CPU 2060 via interface 2409 coupled to system bus 2015.

Referring to further aspects of indicia reading terminal 2000, terminal 2000 can include electrical power input unit 55 for inputting of energy for changing an optical characteristic of focusing apparatus 100, and therefore changing an optical characteristic (e.g., focal length, plane of optimal focus) of lens assembly 200. In one embodiment, an energy input to lens assembly 200 can be varied to vary a plane of optimum focus of a laser beam that is shaped by optics 2018, 200, 2028. A plane (or distance) of optimum focus of a projected laser beam can be varied between a first distance $L_1$ of optimum focus and a second distance $L_2$ of optimum focus.

In another aspect, terminal 2000 can include a temperature sensing assembly 2502 including a temperature sensor 2504 and an analog to digital converter 2506 for sensing a temperature of fluid containing lens element 10 of lens assembly 200. Temperature sensor 2504 can be disposed at or in proximity with a fluid containing lens element 10 of lens assembly 200. CPU 2060 can be in communication with temperature sensing assembly 2502 via interface 2510 coupled to assembly 2502 and system bus 2015.

Further regarding terminal 2000, an electrical power input for establishing a desired lens setting can be responsive to a temperature sensed by sensor 2504. It has been mentioned that at higher temperatures a lens membrane and/or lens fluid can expand to result in changes in optical characteristics of the lens element. To compensate for the lens element characteristic changes resulting from thermal expansion, an electrical power input for establishing a lens setting of lens assembly 200 can be varied.

Figures 27, 28:
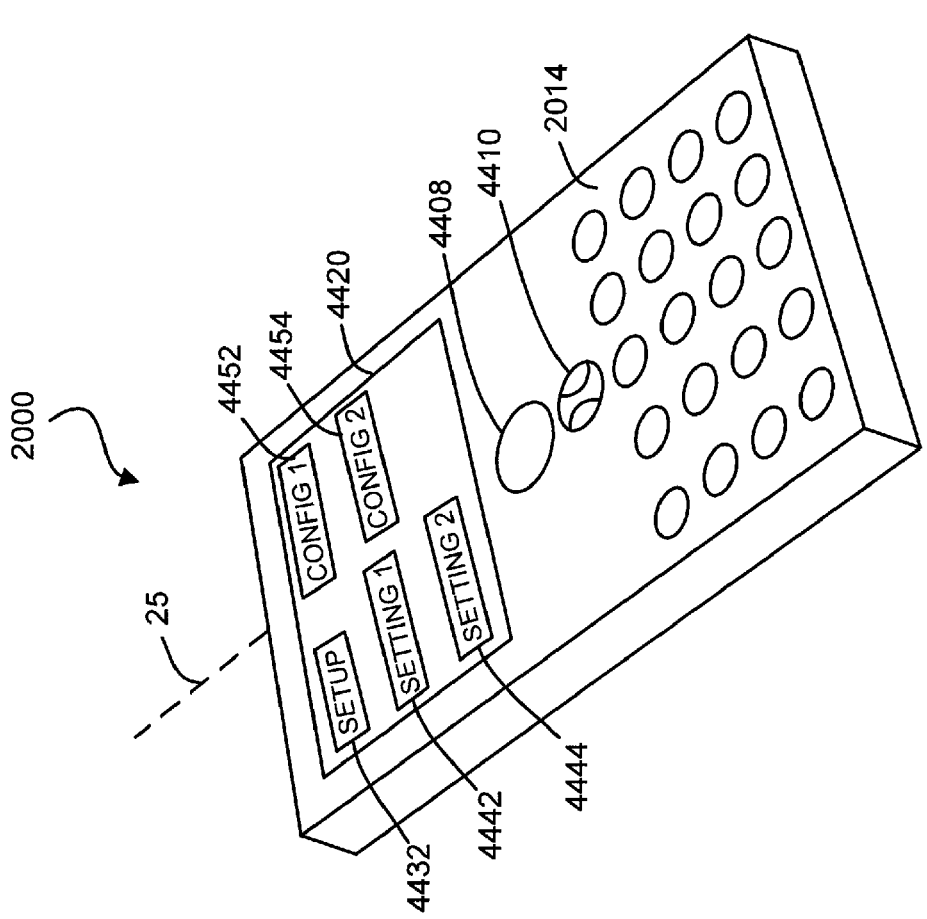
FIG. 27 is a perspective view of an indicia reading terminal having a hand held housing.
FIG. 28 illustrates a table for control of an indicia reading terminal.

A physical form view of a laser scanning based indicia reading terminal 2000 is shown in FIG. 27. Terminal 2000 can include display 4420 and trigger 4408 disposed on a common side of hand held housing 2014. A user interface of terminal 2000 can be provided by display 4420 and pointer mechanism 4410 in combination. A user interface of terminal 2000 can also be provided, e.g., by configuring terminal 2000 to be operative to be programmed by decoding of programming bar code symbols. In another embodiment, hand held housing 2014 can be devoid of a display and can include a gun style form factor.

In another aspect, terminal 2000 can be operated in a setup mode selectable by selection of button 4432 using a user interface of terminal 2000. A setup mode can be activated for determining power inputs corresponding to various lens settings. In a setup mode, terminal 2000 can be operated at various temperatures and a electrical power input can be varied until a desired reference lens setting is achieved. Repeating the process for several settings and sensed temperatures a control table 4490 as shown in FIG. 28 can be established. Once table 4490 is established, the setup mode can be deactivated by de-selection of button 4432 and operated in a run mode. In a run mode, terminal 2000 can operate according to a selected first or second configuration as described herein or according to another configuration. For establishing a certain (e.g., selected) lens setting when operating in a run mode, terminal 2000 can utilize table 4490 for determining a power input level for establishing a certain lens setting. Terminal 2000 in one embodiment, can be operative so that a setup mode can be activated by an end user operator of terminal 2000. In another embodiment, terminal 2000 can be operative so that the setup mode is restricted from being activated by an operator user and can only be activated by a manufacturer provider user. In one embodiment, terminal 2000 can be operative so that a setup mode can be activated prior to the incorporation of terminal components into housing 2014.

Referring to terminal 2000, terminal 2000 can be operative to move a lens setting of lens assembly 200 between at least a first plane of optimum focus setting and a second plane of optimum focus setting. Still further, terminal 2000 can be operative to generate at least a first signal corresponding to a first scan with the lens assembly 200 at the first setting and a second signal corresponding to a second scan with the lens assembly at the second setting, and terminal 2000 can be further operative to attempt to decode a decodable indicia utilizing the first signal and the second signal. The second scan to which the second signal corresponds to can be a successive scan in relation to the first scan or a non-successive subsequent scan in relation to the first scan.

Terminal 2000 can be operative so that terminal 2000 can generate a succession of scans and signals corresponding to the scans when an operator activated read attempt is activated by an operator actuation of a trigger 4408. Terminal 2000 can subject one or more generated signals to a decode attempt and the scanning, signal generating, and decode attempting can continue until a read attempt is deactivated e.g., by a release of trigger 4408 or by a successful decode.

Terminal 2000 in a first operator activated configuration set forth herein can be operative to move a lens setting of lens assembly 200 between at least a first and second lens setting of the lens assembly during a time that terminal 2000 executes an operator activated read attempt of the terminal. Further, terminal 2000 can be operative so that the first and second signals are generated during a single operator activated read attempt.

Indicia reading terminal 2000 in a second operator activated configuration set forth herein can be operative to maintain a lens setting of the terminal at a certain lens setting during a time that the terminal executes an operator activated read attempt of terminal 2000. Terminal 2000 can be operative to move the lens setting in accordance to an operator input command input subsequent to a first operator activated read attempt and prior to a second operator activated read attempt. Terminal 2000 can be operative so that the first signal and the second signal are output during separate first and second operator activated read attempts of terminal 2000.

Terminal 2000 can be operative to move the lens setting of lens assembly 200 between the first lens setting and the second lens setting and in other embodiments additional settings in response to a manual selection of a lens setting by an operator. For example, terminal 2000 can have a user interface comprising a display 4420 and pointer mechanism 4410, and an operator can utilize the user interface to select a lens setting by selection of a displayed button 4442, 4444 corresponding to the desired lens setting. Terminal 2000 can further be operative so that when the second configuration is active, terminal 2000 in response to a trigger signal being made active via actuation of trigger 4408, maintains the lens setting at the selected lens setting through the capture of a plurality of signals, including the first and second signals when attempting to decode a decodable indicia in response to a trigger signal being made active to initiate a decode attempt with use of trigger 4408.

The first described functionality where terminal 2000 moves a lens setting between different lens settings during an operator activated read attempt, and the second described functionality where terminal 2000 maintains a lens setting at a certain setting through a read attempt can each be activated in response to an operator selected configuration selection. Terminal 2000 can be operative so that an operator can select between the first and second configurations using the user interface of terminal 2000 by selection of a button 4452 (first configuration), or button 4454 (second configuration) corresponding to the desired configuration.

Figure 29:
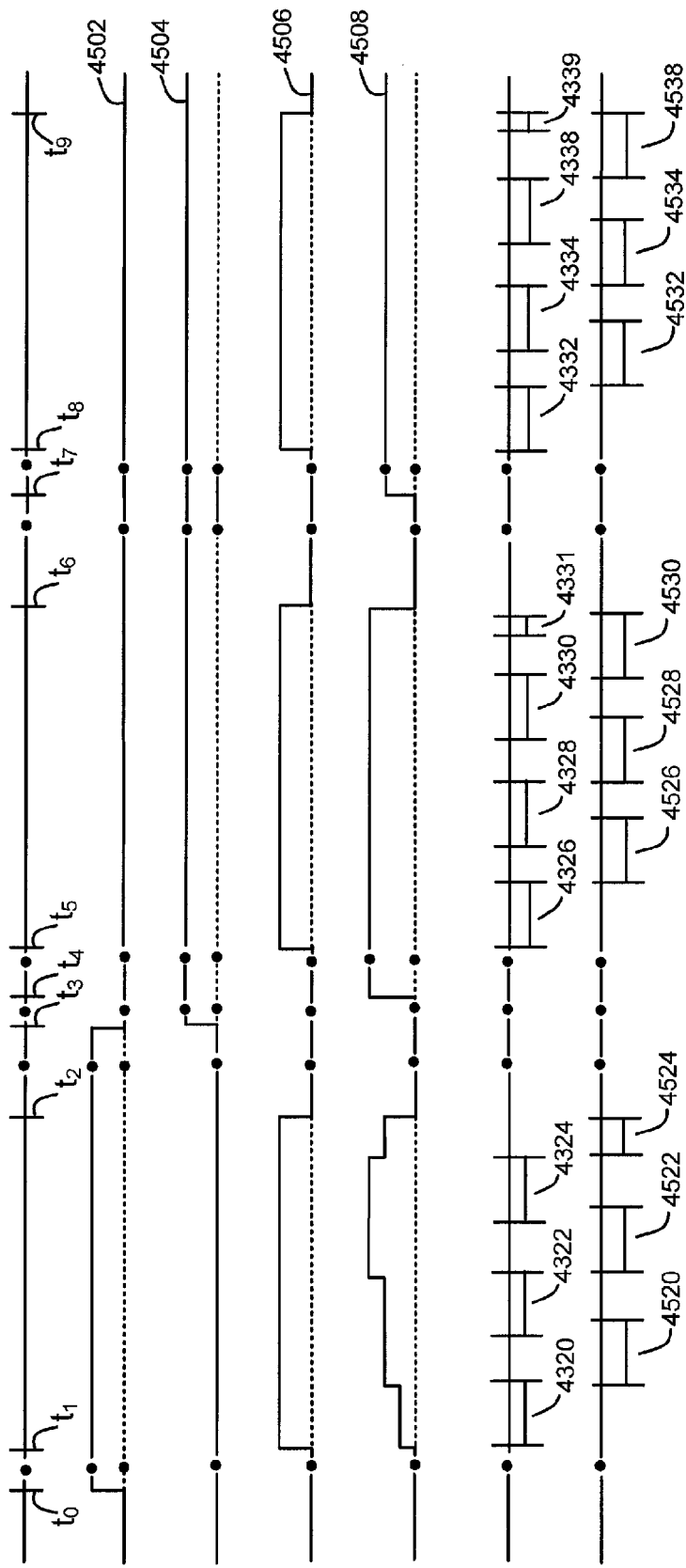
FIG. 29 is a timing diagram illustrating operational aspects of an indicia reading terminal.

A timing diagram further illustrating operation of terminal 2000 in one embodiment is shown in FIG. 29. The timing diagram of FIG. 29 illustrates terminal 2000 undergoing a change in configuration from a first configuration in which a variable lens assembly 200 of terminal 2000 is varied during a read attempt to a second configuration in which a variable lens assembly 200 of terminal 2000 remains at a fixed setting throughout a read attempt.

Referring to the timing diagram of FIG. 29, signal 4502 is a state signal representing an active or inactive state of the first user selectable configuration (moving lens setting). Signal 4504 is a state signal representing the state of a second described user selectable configuration (fixed lens setting). Signal 4506 is a trigger signal which can be made active by actuation of trigger 4408, and which can be deactivated by releasing of trigger 4408 which may become inactive after a time out period or after a successful decode of a decodable indicia. Signal 4506 represents an energy input level input into lens assembly 200 of terminal 2000. Scanning periods 4320, 4322, 4324, 4326, 4328, 4330, 4331, 4332, 4334, 4338, and 4339 are scanning periods during which the described laser beam is scanned across a target for generation of a processable signal.

Referring to processing periods 4520, 4522, 4524, 4526, 4528, 4530, 4532, 4534, 4538, the noted processing periods can represent processing periods during which time CPU 2060 of terminal 2000 processes stored (e.g., buffered) digital signals representing reflected beams reflected from a target for attempting to decode a decodable indicia.

With further reference to the timing diagram of FIG. 29, an operator at time $t_1$ can select configuration 1 using e.g., button 4452 so that terminal 2000 is set in a mode in which a lens setting of lens assembly 200 will vary during a read attempt. At time $t_1$, an operator can activate trigger signal 4506. In response to trigger signal 4506 being activated terminal 2000 can generate a plurality of signals, each representing light reflected from a target during a scan of a light beam thereacross.

Referring to the timing diagram of FIG. 29, the energy input level input for establishing a setting of lens assembly 200 is represented by signal 4508 may be at different levels during each of respective scanning periods 4320, 4322, 4324 when terminal 2000 operates in a first (moving lens) configuration. At time $t_2$, trigger signal 4506 can be deactivated e.g., by successful decode or a release of trigger 4408. At time $t_3$, an operator can activate the second configuration as described herein e.g., by actuation of button 4454. Sometime thereafter, an operator may manually select a lens setting of lens assembly 200 e.g., by actuation of a lens setting button 4442, 4444 of terminal 2000 or other provided buttons if terminal 2000 is adapted so that further lens settings are available.

Referring to signal 4508, signal 4508 can be established at an energy level corresponding to the selected lens setting. At time $t_5$, a trigger signal 4506 can be activated again, e.g., by an operator actuation of trigger 4408. A plurality of scanning periods can ensue as seen by scanning periods 4326, 4328, 4330, 4331. When operating in the second configuration, an energization input level into lens assembly 200 and therefore a setting of lens assembly 200 can remain constant. At time $t_6$, trigger signal 4506 can be deactivated e.g., by a release of trigger 4408 or by a successful decode of a message. At time $t_7$, with terminal 2000 still operating in a second configuration, an operator can move a lens setting to a different lens setting e.g., by using a lens setting selection button 4442, 4444 of terminal 2000. In response thereto, an energization level for establishing a setting of lens assembly 200 can move to a level correlated to the setting as is seen by signal 4508. A trigger signal 4506 can thereafter be activated again at time $t_8$. A plurality of scanning periods 4332, 4334, 4338, 4339 can ensue with a lens setting remaining at a setting corresponding to the constant lens setting energization level during scanning periods 4332, 4334, 4338, 4339 represented by signal 4508 as seen in timing the diagram of FIG. 29. Technologies that are disclosed in U.S. patent application Ser. No. 12/432,517, entitled "LASER SCANNER WITH DEFORMABLE LENS" and U.S. patent application Ser. No. 12/432,534, entitled "LASER SCANNER WITH IMPROVED DECODING" each filed concurrently herewith, and incorporated herein by reference in its entirety (including laser scanning based terminal technologies) can be used with systems, apparatuses, and methods described herein.

Mode, configuration, or setting selections described herein described as being made with use of a user interface comprising a display and pointer mechanism of terminal 1000 or terminal 2000 can also be made with use of another user interface, e.g., by reading of programming bar code symbols.

A small sample of systems methods and apparatus that are described herein is as follows:

A1. A lens element comprising:
a deformable membrane having a region adapted for transmission of image forming light rays;
a light transmissive member opposing the deformable membrane, the light transmissive member partially delimiting a cavity, the cavity being further partially delimited by the deformable membrane; and
an optical fluid disposed in the cavity, wherein a linear temperature expansion coefficient of the optical fluid is different than a linear temperature expansion coefficient of the deformable membrane, the deformable membrane, the light transmissive member and the optical fluid defining an imaging axis about which the image forming light rays are transmitted;
wherein the deformable membrane includes a formation formed thereon, the formation being formed at a location of the deformable membrane other than at the region adapted for transmission of image forming light rays, the lens element being adapted so that when the deformable membrane exhibits thermal expansion, the deformable membrane deforms preferentially at the formation.

A2. The lens element of claim A1, wherein the formation delimits the region adapted for transmission of image forming light rays.

A3. The lens element of claim A1, wherein the formation is operative so that when the deformable membrane exhibits thermal expansion, an amount of surface perturbation of the deformable membrane is reduced relative to an expected amount of surface perturbation of the deformable membrane in the absence of the formation.

A4. The lens element of claim A1, wherein the image forming light rays transmitted through the region in the absence of thermal expansion of the deformable membrane follow a first path, and wherein the formation is operative so that when the deformable membrane exhibits thermal expansion an amount of deviation of the image forming light rays from the first path is reduced relative to an expected amount of deviation of the light rays from the first path in the absence of the formation.

A5. The lens element of claim A1, wherein the region for transmission of the image forming light rays is provided at a center of the deformable membrane.

A6. The lens element of claim A1, wherein the formation is circumferentially disposed about the imaging axis.

A7. The lens element of claim A1, wherein the membrane has a periphery radially spaced from the imaging axis throughout the length of the periphery, wherein the formation is circumferentially disposed about the imaging axis intermediate the imaging axis and the periphery.

A8. The lens element of claim A1, wherein the formation is circumferentially disposed about the imaging axis, and includes a cross section that is characterized by a general accordion configuration, the cross section having a first portion that extends internally relative to a surface level of the deformable membrane at an angle with respect to the surface level, a second portion also extending internally relative to the surface level at an angle with respect to the surface level, the first and second portions being joined at an angle defined internally relative to the surface level of the membrane.

A9. The lens element of claim A8, wherein the angle of the first portion extending with respect to the surface level is about 45 degrees.

A10. The lens element of claim A8, wherein the angle of the first portion extending with respect to the surface level is between about 30 degrees and 60 degrees.

A11. The lens element of claim A8, wherein the formation is characterized by a plurality of folds.

A12. The lens element of claim A1, wherein the formation includes an accordion cross sectional feature.

A13. The lens element of claim A1, wherein the formation includes an accordion cross sectional feature disposed circumferentially about an axis of the lens element.

A14. The lens element of claim A1, wherein the formation includes a plurality of concentrically disposed accordion cross sectioned features.

A15. The lens element of claim A1, wherein the formation includes a generally sinusoidal cross sectioned feature.

A16. The lens element of claim A1, wherein a material thickness of the deformable membrane is thicker at the region adapted for transmission of image forming light ray than at the location of the formation.

A17. The lens element of claim A1, wherein the formation is preformed in the surface membrane utilizing injection molding.

A18. The lens element of claim A1, wherein the light transmissive member has optical power.

A19. The lens element of claim A1, wherein the light transmissive member is a deformable member.

A20. The lens element of claim A1, wherein the formation is preformed in the surface membrane utilizing a casting process.

B1. An indicia reading terminal comprising:
an imaging assembly including an image sensor having a plurality of pixels;
a memory for storing image data, and a controller for processing the image data for attempting to decode decodable indicia represented in the image data;
a variable lens assembly for focusing an image of a target onto the image sensor, the variable lens assembly having a lens element comprising a deformable membrane and an opposing light transmissive member delimiting a cavity and optical fluid disposed in the cavity, wherein the deformable membrane has a linear temperature expansion coefficient different than a linear temperature expansion coefficient of the optical fluid, the deformable membrane having a formation, the deformable membrane being adapted to deform preferentially at the formation when the lens element is subject to temperatures causing thermal expansion of the lens element;
wherein the indicia reading terminal is operative to move a lens setting of the lens assembly between at least first and second different lens settings, the lens assembly having a first plane of optimum focus at the first lens setting and a second plane of optimum focus at the second lens setting, the indicia reading terminal further being operative to expose a first frame of image data with the lens assembly at the first lens setting and a second frame of image data with the lens assembly at the second lens focus setting, and wherein the terminal is further configured so that the terminal is operative to subject each of the first and second frames of image data to a decode attempt for decoding of a decodable indicia.

B2. The indicia reading terminal of claim B1, wherein the terminal is operative to move a lens setting of the lens assembly between the first and the second lens settings of the lens assembly during a time that the terminal executes an operator activated read attempt of the terminal, the terminal further being operative so that the first and second frames are exposed during a single operator activated read attempt of the terminal.

B3. The indicia reading terminal of claim B1, wherein the terminal is operative to maintain a lens setting of the lens assembly at a certain lens setting during a time that the terminal executes an operator activated read attempt of the terminal, the terminal being operative to move the lens setting in accordance with an operator input command input subsequent to a first operator activated read attempt and prior to a second operator activated read attempt, the terminal further being operative so that the first frame and the second frame are exposed during separate first and second separate operator activated read attempts of the terminal.

BB1. An indicia reading terminal comprising:
 an imaging assembly including an image sensor having a plurality of pixels;
 a memory for storing image data, and a controller for processing the image data for attempting to decode decodable indicia represented in the image data;
 a variable lens assembly for focusing an image of a target onto the image sensor, the variable lens assembly having a lens element comprising a deformable membrane, optical fluid, and an actuator including a ring shaped member for imparting a force on the deformable membrane;
 a temperature sensor for sensing a temperature of the lens element;
 wherein the indicia reading terminal is operative to move a setting of the lens assembly between at least first and second lens setting, the lens assembly having a first plane of optimum focus at the first lens setting and a second plane of optimum focus at the second lens setting, the indicia reading terminal further being operative to expose a first frame of image data with the lens assembly at the first lens setting and a second frame of image data with the lens assembly at the second lens setting, and wherein the terminal is further configured so that the terminal is operative to subject each of the first and second frames of image data to a decode attempt for decoding of a decodable indicia;
 wherein the terminal is operative so that the terminal when moving the lens assembly to the first lens setting utilizes a temperature output by the temperature for determining an input electrical power level for application for establishing the first lens setting.

BB2. The indicia reading terminal of claim BB1, wherein the lens element comprises a deformable membrane and an opposing wall delimiting a cavity, the optical fluid being disposed in the cavity, wherein the deformable membrane has a linear temperature expansion coefficient different than a linear temperature expansion coefficient of the optical fluid, the deformable membrane having a formation wherein the deformable membrane is adapted to preferentially deform at the formation when the lens element is subject to temperatures causing thermal expansion of at least one of the deformable membrane or the optical fluid.

C1. An indicia reading terminal comprising:
 a laser source emitting laser light;
 a scanning apparatus for scanning the laser light across the target, wherein the terminal is operative so that a plane of optimum focus of the laser light scanned across the target varies based on a present lens setting of the lens assembly;
 a variable lens assembly for focusing the laser light onto the target, the variable lens assembly having a lens element comprising a deformable membrane and an opposing light transmissive member delimiting optical fluid disposed in the cavity, wherein the deformable membrane has a linear temperature expansion coefficient different than a linear temperature expansion coefficient of the optical fluid, the deformable membrane having a formation the deformable membrane being adapted to deform preferentially at the formation when the lens element is subject to temperatures causing thermal expansion of the lens element;
 wherein the terminal is operative to move the lens assembly between a first lens setting and a second lens setting, and is further operative to generate a first signal corresponding to a first scan with the lens assembly at the first lens setting and a second signal corresponding to a second scan with the lens assembly at the second lens setting, and wherein the terminal is further operative to attempt to decode a decodable indicia utilizing the first signal and the second signal.

C2. The indicia reading terminal of claim C1, wherein the terminal is operative to move a lens setting of the lens assembly between the first and the second lens settings of the lens assembly during a time that the terminal executes an operator activated read attempt of the terminal, the terminal further being operative so that the first and second signals are generated during a single operator activated read attempt.

C3. The indicia reading terminal of claim C1, wherein the terminal is operative to maintain a lens setting of the lens assembly at a certain lens setting during a time that the terminal executes an operator activated read attempt of the terminal, the terminal being operative to move the lens setting in accordance to an operator input command input subsequent to a first operator activated read attempt and prior to a second operator activated read attempt, the terminal further being operative so that the first signal and the second signal are output during separate first and second operator activated read attempts of the terminal.

CC1. An indicia reading terminal comprising:
 a laser source emitting laser light;
 a variable lens assembly for focusing the laser light onto a target, the variable lens assembly having a lens element comprising optical fluid;
 a scanning apparatus for scanning the laser light across the target, wherein the terminal is operative so that a plane of optimum focus of the laser light scanned across the target varies based on a present lens setting of the lens assembly;
 a temperature sensor for sensing a temperature of the optical fluid;
 wherein the terminal is operative to move a the lens assembly between a first lens setting and a second lens setting, the lens assembly having a first plane of optimal focus at the first lens setting and a second plane of optimal focus at the second lens setting, wherein the terminal is further operative to generate a first signal corresponding to a first scan with the lens assembly at the first setting and a second signal corresponding to a second scan with the lens assembly at the second setting, and wherein the terminal is further operative to attempt to decode a decodable indicia utilizing the first signal and the second signal;
 wherein the terminal is operative so that the terminal when moving the lens setting to the first lens setting utilizes a temperature output by the temperature for determining an appropriate input electrical power level for application for establishing the first lens setting.

CC2. The indicia reading terminal of claim CC1, wherein the lens element comprises a deformable membrane and an opposing light transmissive membrane delimiting a cavity, the optical fluid being disposed in the cavity, wherein the deformable membrane has a linear temperature expansion coefficient different than a linear temperature expansion coefficient of the optical fluid, the deformable membrane having a formation, wherein the deformable membrane is adapted to deform preferentially at the formation when the lens element is subject to temperatures causing thermal expansion of one of the deformable membrane or the optical fluid.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A lens element comprising:
   a deformable membrane having a region adapted for transmission of image forming light rays;
   a light transmissive member opposing the deformable membrane, the light transmissive member partially delimiting a cavity, the cavity being further partially delimited by the deformable membrane; and
   an optical fluid disposed in the cavity, wherein a linear temperature expansion coefficient of the optical fluid is different than a linear temperature expansion coefficient of the deformable membrane, the deformable membrane, the light transmissive member and the optical fluid defining an imaging axis about which the image forming light rays are transmitted;
   wherein the deformable membrane includes a formation formed thereon, the formation being formed at a location of the deformable membrane other than at the region adapted for transmission of image forming light rays, the lens element being adapted so that when the deformable membrane exhibits thermal expansion, the deformable membrane deforms preferentially at the formation.

2. The lens element of claim 1, wherein the formation delimits the region adapted for transmission of image forming light rays.

3. The lens element of claim 1, wherein the formation is operative so that when the deformable membrane exhibits thermal expansion, an amount of surface perturbation of the deformable membrane is reduced relative to an expected amount of surface perturbation of the deformable membrane in the absence of the formation.

4. The lens element of claim 1, wherein the image forming light rays transmitted through the region in the absence of thermal expansion of the deformable membrane follow a first path, and wherein the formation is operative so that when the deformable membrane exhibits thermal expansion an amount of deviation of the image forming light rays from the first path is reduced relative to an expected amount of deviation of the light rays from the first path in the absence of the formation.

5. The lens element of claim 1, wherein the region for transmission of the image forming light rays is provided at a center of the deformable membrane.

6. The lens element of claim 1, wherein the formation is circumferentially disposed about the imaging axis.

7. The lens element of claim 1, wherein the membrane has a periphery radially spaced from the imaging axis throughout the length of the periphery, wherein the formation is circumferentially disposed about the imaging axis intermediate the imaging axis and the periphery.

8. The lens element of claim 1, wherein the formation is circumferentially disposed about the imaging axis, and includes a cross section that is characterized by a general accordion configuration, the cross section having a first portion that extends internally relative to a surface level of the deformable membrane at an angle with respect to the surface level, a second portion also extending internally relative to the surface level at an angle with respect to the surface level, the first and second portions being joined at an angle defined internally relative to the surface level of the membrane.

9. The lens element of claim 8, wherein the angle of the first portion extending with respect to the surface level is about 45 degrees.

10. The lens element of claim 8, wherein the angle of the first portion extending with respect to the surface level is between about 30 degrees and 60 degrees.

11. The lens element of claim 8, wherein the formation is characterized by a plurality of folds.

12. The lens element of claim 1, wherein the formation includes an accordion cross sectional feature.

13. The lens element of claim 1, wherein the formation includes an accordion cross sectional feature disposed circumferentially about an axis of the lens element.

14. The lens element of claim 1, wherein the formation includes a plurality of concentrically disposed accordion cross sectioned features.

15. The lens element of claim 1, wherein the formation includes a generally sinusoidal cross sectioned feature.

16. The lens element of claim 1, wherein a material thickness of the deformable membrane is thicker at the region adapted for transmission of image forming light ray than at the location of the formation.

17. The lens element of claim 1, wherein the formation is preformed in the deformable membrane utilizing injection molding.

18. The lens element of claim 1, wherein the light transmissive member has optical power.

19. The lens element of claim 1, wherein the light transmissive member is a deformable member.

20. The lens element of claim 1, wherein the formation is preformed in the deformable membrane utilizing a casting process.

21. An indicia reading terminal comprising:
   an imaging assembly including an image sensor having a plurality of pixels;
   a memory for storing image data, and a controller for processing the image data for attempting to decode decodable indicia represented in the image data;
   a variable lens assembly for focusing an image of a target onto the image sensor, the variable lens assembly having a lens element comprising a deformable membrane and an opposing light transmissive member delimiting a cavity and optical fluid disposed in the cavity, wherein the deformable membrane has a linear temperature expansion coefficient different than a linear temperature expansion coefficient of the optical fluid, the deformable membrane having a formation, the deformable membrane being adapted to deform preferentially at the formation when the lens element is subject to temperatures causing thermal expansion of the lens element;

wherein the indicia reading terminal is operative to move a lens setting of the lens assembly between at least first and second different lens settings, the lens assembly having a first plane of optimum focus at the first lens setting and a second plane of optimum focus at the second lens setting, the indicia reading terminal further being operative to expose a first frame of image data with the lens assembly at the first lens setting and a second frame of image data with the lens assembly at the second lens setting, and wherein the terminal is further configured so that the terminal is operative to subject each of the first and second frames of image data to a decode attempt for decoding of a decodable indicia.

22. The indicia reading terminal of claim 21, wherein the terminal is operative to move a lens setting of the lens assembly between the first and the second lens settings of the lens assembly during a time that the terminal executes an operator activated read attempt of the terminal, the terminal further being operative so that the first and second frames are exposed during a single operator activated read attempt of the terminal.

23. The indicia reading terminal of claim 21, wherein the terminal is operative to maintain a lens setting of the lens assembly at a certain lens setting during a time that the terminal executes an operator activated read attempt of the terminal, the terminal being operative to move the lens setting in accordance with an operator input command input subsequent to a first operator activated read attempt and prior to a second operator activated read attempt, the terminal further being operative so that the first frame and the second frame are exposed during separate first and second separate operator activated read attempts of the terminal.

24. An indicia reading terminal comprising:
an imaging assembly including an image sensor having a plurality of pixels;
a memory for storing image data, and a controller for processing the image data for attempting to decode decodable indicia represented in the image data;
a variable lens assembly for focusing an image of a target onto the image sensor, the variable lens assembly having a lens element comprising a deformable membrane, optical fluid, and an actuator including a ring shaped member for imparting a force on the deformable membrane;
a temperature sensor for sensing a temperature of the lens element;
wherein the indicia reading terminal is operative to move a setting of the lens assembly between at least first and second lens setting, the lens assembly having a first plane of optimum focus at the first lens setting and a second plane of optimum focus at the second lens setting, the indicia reading terminal further being operative to expose a first frame of image data with the lens assembly at the first lens setting and a second frame of image data with the lens assembly at the second lens setting, and wherein the terminal is further configured so that the terminal is operative to subject each of the first and second frames of image data to a decode attempt for decoding of a decodable indicia;
wherein the terminal is operative so that the terminal when moving the lens assembly to the first lens setting utilizes a temperature output by the temperature sensor for determining an input electrical power level for application for establishing the first lens setting, wherein the lens element comprises a deformable membrane and an opposing wall delimiting a cavity, the optical fluid being disposed in the cavity, wherein the deformable membrane has a linear temperature expansion coefficient different than a linear temperature expansion coefficient of the optical fluid, the deformable membrane having a formation wherein the deformable membrane is adapted to preferentially deform at the formation when the lens element is subject to temperatures causing thermal expansion of at least one of the deformable membrane or the optical fluid.

25. An indicia reading terminal comprising:
a laser source emitting laser light;
a scanning apparatus for scanning the laser light across a target, wherein the terminal is operative so that a plane of optimum focus of the laser light scanned across the target varies based on a present lens setting of a lens assembly;
a variable lens assembly for focusing the laser light onto the target, the variable lens assembly having a lens element comprising a deformable membrane and an opposing light transmissive member delimiting optical fluid disposed in a cavity, wherein the deformable membrane has a linear temperature expansion coefficient different than a linear temperature expansion coefficient of the optical fluid, the deformable membrane having a formation the deformable membrane being adapted to deform preferentially at the formation when the lens element is subject to temperatures causing thermal expansion of the lens element;
wherein the terminal is operative to move the lens assembly between a first lens setting and a second lens setting, and is further operative to generate a first signal corresponding to a first scan with the lens assembly at the first lens setting and a second signal corresponding to a second scan with the lens assembly at the second lens setting, and wherein the terminal is further operative to attempt to decode a decodable indicia utilizing the first signal and the second signal.

26. The indicia reading terminal of claim 25, wherein the terminal is operative to move a lens setting of the lens assembly between the first and the second lens settings of the lens assembly during a time that the terminal executes an operator activated read attempt of the terminal, the terminal further being operative so that the first and second signals are generated during a single operator activated read attempt.

27. The indicia reading terminal of claim 25, wherein the terminal is operative to maintain a lens setting of the lens assembly at a certain lens setting during a time that the terminal executes an operator activated read attempt of the terminal, the terminal being operative to move the lens setting in accordance to an operator input command input subsequent to a first operator activated read attempt and prior to a second operator activated read attempt, the terminal further being operative so that the first signal and the second signal are output during separate first and second operator activated read attempts of the terminal.

28. An indicia reading terminal comprising:
a laser source emitting laser light;
a variable lens assembly for focusing the laser light onto a target, the variable lens assembly having a lens element comprising optical fluid;
a scanning apparatus for scanning the laser light across the target, wherein the terminal is operative so that a plane of optimum focus of the laser light scanned across the target varies based on a present lens setting of the lens assembly;

a temperature sensor for sensing a temperature of the optical fluid;

wherein the terminal is operative to move a the lens assembly between a first lens setting and a second lens setting, the lens assembly having a first plane of optimal focus at the first lens setting and a second plane of optimal focus at the second lens setting, wherein the terminal is further operative to generate a first signal corresponding to a first scan with the lens assembly at the first setting and a second signal corresponding to a second scan with the lens assembly at the second setting, and wherein the terminal is further operative to attempt to decode a decodable indicia utilizing the first signal and the second signal;

wherein the terminal is operative so that the terminal when moving the lens setting to the first lens setting utilizes a temperature output by the temperature sensor for determining an appropriate input electrical power level for application for establishing the first lens setting, wherein the lens element comprises a deformable membrane and an opposing light transmissive membrane delimiting a cavity, the optical fluid being disposed in the cavity, wherein the deformable membrane has a linear temperature expansion coefficient different than a linear temperature expansion coefficient of the optical fluid, the deformable membrane having a formation, wherein the deformable membrane is adapted to deform preferentially at the formation when the lens element is subject to temperatures causing thermal expansion of one of the deformable membrane or the optical fluid.

* * * * *